United States Patent
La Valle

[15] 3,679,861
[45] July 25, 1972

[54] METHODS OF ASSEMBLING AND TESTING ELECTRICAL COMPONENTS

[72] Inventor: Thomas Alvin La Valle, Annapolis, Md.
[73] Assignee: Western Electric Company, Incorporated, New York, N.Y.
[22] Filed: Aug. 13, 1971
[21] Appl. No.: 171,463

Related U.S. Application Data

[62] Division of Ser. No. 878,017, Nov. 19, 1969, Pat. No. 3,618,204.

[52] U.S. Cl.................................219/117, 219/80, 219/91
[51] Int. Cl.........................................................B23k 11/10
[58] Field of Search.....................219/117, 79, 80, 91, 109

[56]  References Cited

UNITED STATES PATENTS

| | | | |
|---|---|---|---|
| 3,400,448 | 9/1968 | Helda et al. | 29/471.1 |
| 2,100,502 | 11/1937 | Campbell et al. | 228/18 |
| 2,606,268 | 8/1952 | Pityo et al. | 219/107 |
| 3,214,832 | 11/1965 | Schwinghamer | 29/427 |
| 3,473,213 | 10/1969 | Brown | 29/203 |

Primary Examiner—J. V. Truhe
Assistant Examiner—B. A. Reynolds
Attorney—W. M. Kain et al.

[57] ABSTRACT

A rotatable turntable having a plurality of workholders spaced about the periphery thereof is indexed to advance each of the workholders successively through each of a plurality of work stations positioned adjacent the periphery of the turntable to assemble electrical components. A first part positioned in one of the workholders at a first work station has the leading end of an insulated wire extending from a supply of wire welded thereto at a second work station, after which the first part is indexed to a third work station without severing the wire extending from the first part to the supply. At the third work station a portion of the wire extending to the first part in the workholder is severed from the supply and the new leading end of the wire is attached to the first part in the next succeeding workholder. The first part is rotated in the first workholder while tensioning the wire extending from and secured to the first part to wind the wire thereon as the workholder is advanced with the turntable through a fourth and a fifth work station to a sixth work station. At the sixth work station a second part is assembled to the first part and, simultaneously, the insulation on a portion of the wire extending from the first part is stripped. At a seventh work station the trailing portion of the wire is welded to a metal cap which is secured to the second part and the strength of the weld is tested.

1 Claim, 28 Drawing Figures

PATENTED JUL 25 1972 3,679,861

INVENTOR
T. A. LA VALLE
BY E. W. Somers
ATTORNEY

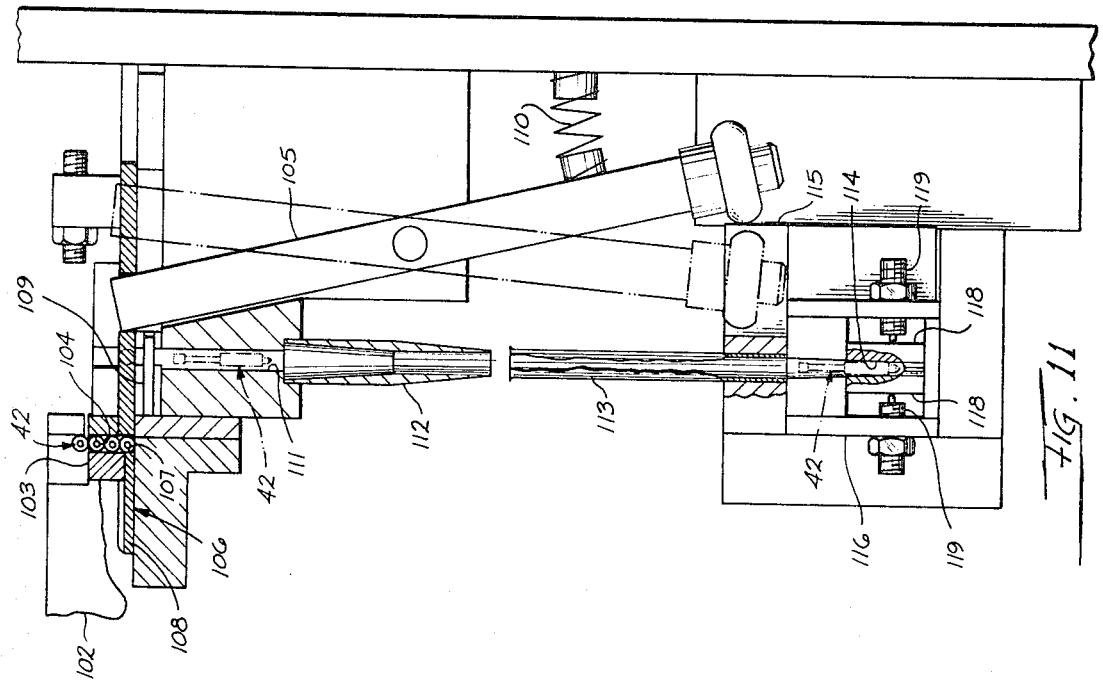
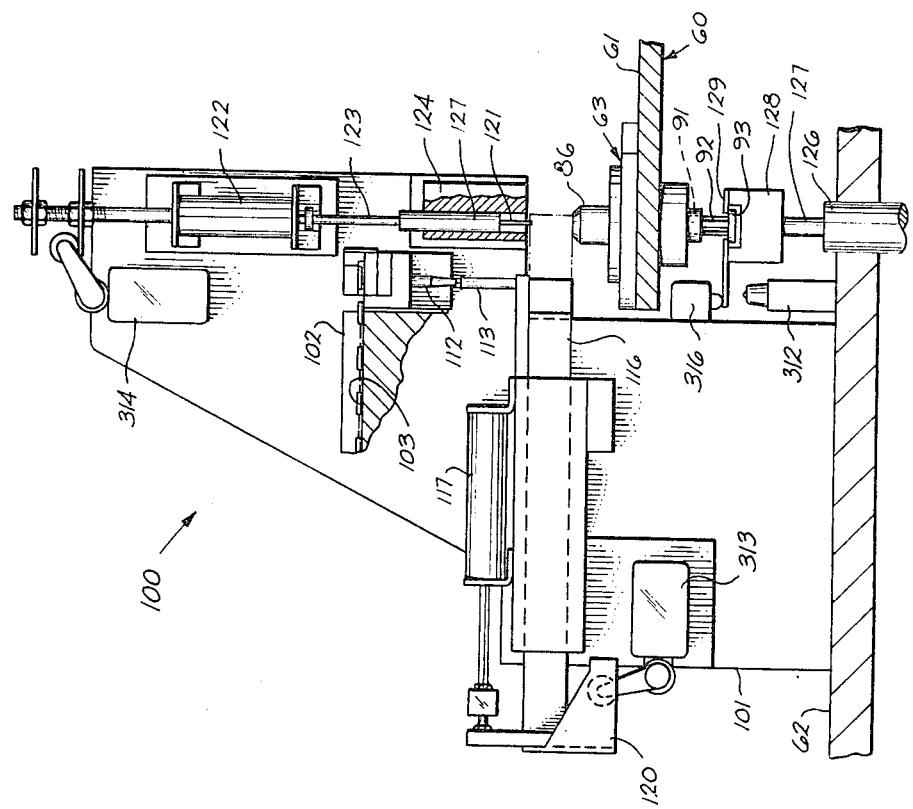

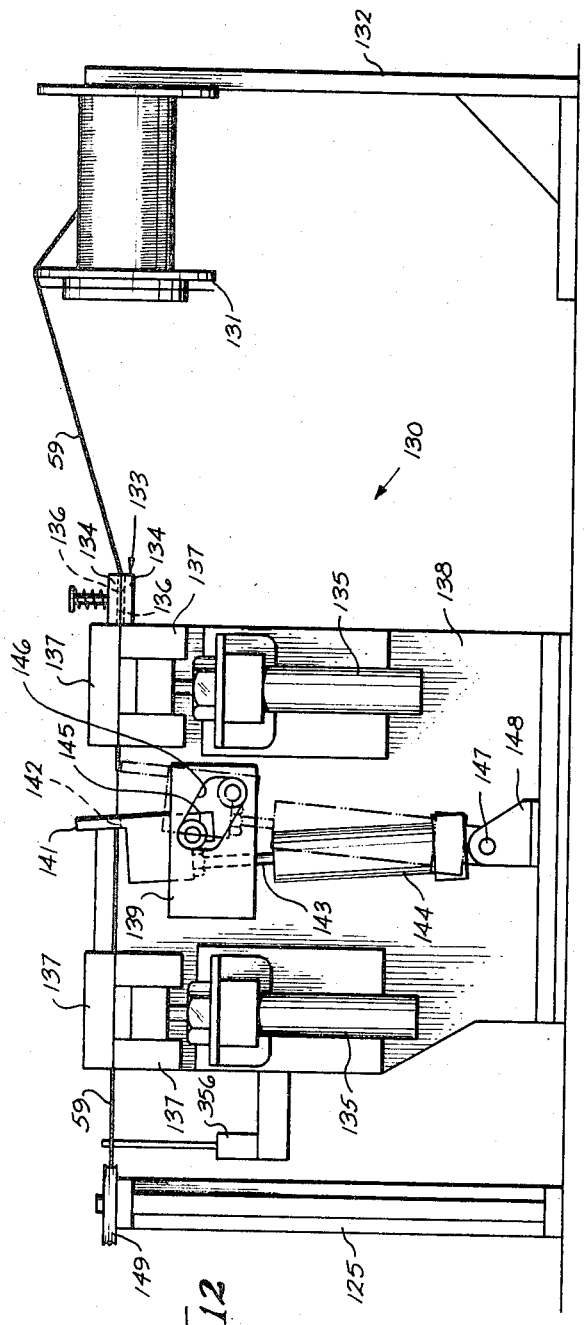
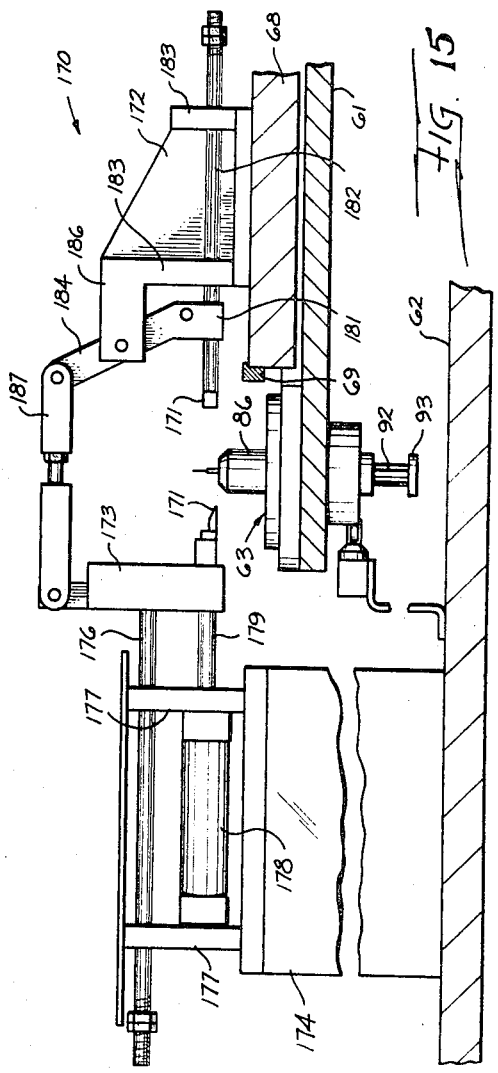

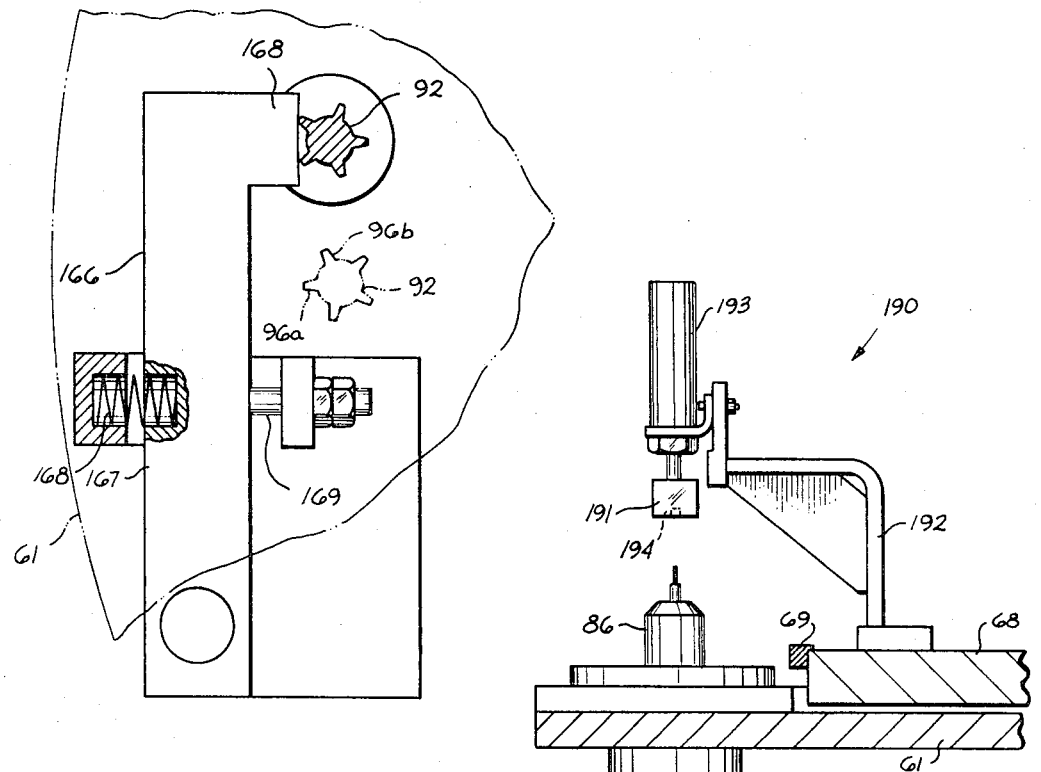
Fig. 14
Fig. 16
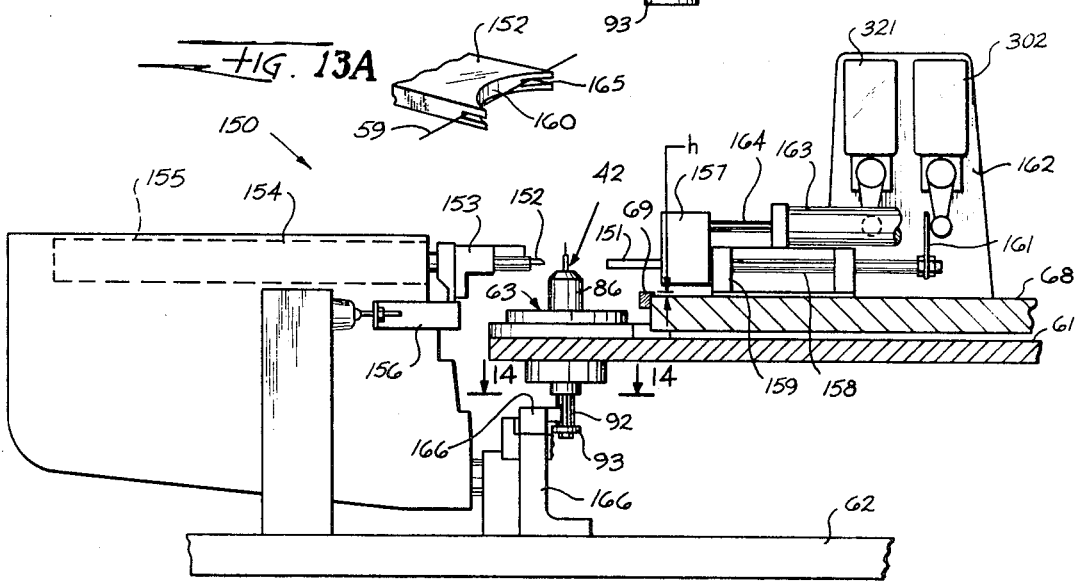
Fig. 13A
Fig. 13

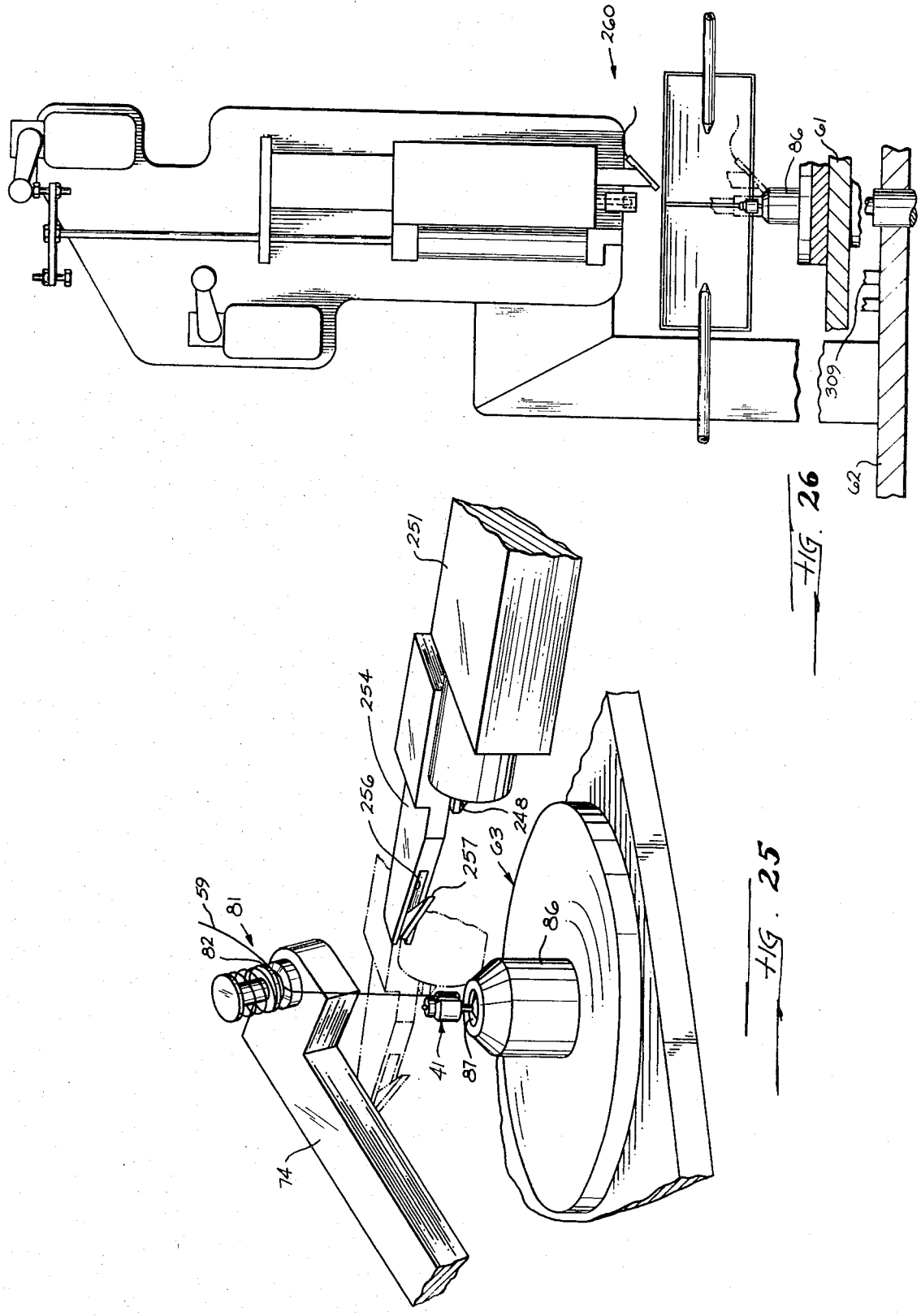

METHODS OF ASSEMBLING AND TESTING ELECTRICAL COMPONENTS

CROSS-REFERENCE TO RELATED APPLICATION

This is a division of application Ser. No. 878,017, filed Nov. 19, 1969, now U.S. Pat. No. 3,618,204.

BACKGROUND OF THE INVENTION

1. Field of the Invention

This invention relates to methods of assembling and testing electrical components and, more particularly, to methods of advancing successive ones of a mass of first parts on an indexable turntable and assembling successive ones of a mass of second parts to successive ones of the first parts and for connecting electrically each assembly of first and second parts to form an electrical component assembly, with each of the connections being tested.

2. Description of the Prior Art

In the manufacturing of electrical components, first parts and second parts must be fabricated and assembled together. For example, in the manufacture of heat coils which are used in central offices in incoming telephone lines to ground out overload currents before these currents damage the equipment in the central office, a bared leading end of an insulated filamentary wire must have a portion thereof welded to a sleeve of a pin and sleeve subassembly and then the wire must be wound around the pin and sleeve subassembly. The trailing end of the wire must be stripped of insulation and welded to a metal cap attached to a plastic shell which has been positioned over the pin and sleeve subassembly.

In the past, many of the operations related to the assembly of these heat coils have been accomplished by hand. Needless to say, this has been a time consuming and expensive task. Clearly, with the large quantities of heat coils which are required in building and maintaining telephone systems, more sophisticated methods and apparatus are in order for the mass production of heat coils.

To date, commercially available apparatus have been available which perform some of the steps required for the more efficient assembly of heat coils. Some of these apparatus include devices for feeding the pin and sleeve subassemblies successively and individually into workholders arranged about the periphery of an indexable turntable. The pin and sleeve subassemblies are fabricated in the workholders and, subsequently, individual ones of a mass of plastic shells having a metal cap secured to one end thereof are fed into engagement with and secured to individual ones of the pin and sleeve subassemblies. Moreover, these apparatus have also included devices for stripping initially a continuous insulated conductor wire from a supply thereof at spaced portions along the length thereof, the spaced portions coincide with the point of initial attachment of the wire to the sleeve of the pin and sleeve subassembly and to the point of subsequent attachment of the trailing end of the wire to the cap on the plastic shell. Facilities have also been provided for winding the wire on the pin and sleeve subassembly as the pin and sleeve subassemblies are advanced through the work stations spaced about the periphery of the turntable. Welding stations are provided in these apparatus for welding the leading and the trailing ends of each length of wire to the sleeve of the pin and sleeve subassembly and to the metal cap, respectively. However, no facilities were provided in these apparatus for strength testing the weld of the trailing end of the wire to the cap.

SUMMARY OF THE INVENTION

It is an object of this invention to provide new and improved methods of assembling and testing automatically electrical components.

It is another object of this invention to provide methods of assembling automatically successive ones of a plurality of first parts with successive ones of a plurality of second parts and for joining a wire to the first and second parts of each assembly thereof.

Still another object of this invention is to provide new and improved methods of testing the strength of a joint between a portion of a length of wire bonded to a part.

A method of automatically assembling successive ones of a mass of second parts to successive ones of a mass of first parts and for joining a wire to the first and second parts of each assembly of first and second parts, embodying certain principles of the present invention, may include the steps of conveying in seriatim successive ones of the first parts, stripping successive spaced portions of an insulating wire extending from a supply, bonding the successive spaced portions to successive ones of the first parts after which successive ones of the first parts are advanced to a subsequent work station with the wire running from the first part to the supply. A length of the wire extending to successive ones of the first parts is severed from the supply with the new leading end of the wire bonded to the next successive succeeding first part. The successive lengths of wire are tensioned and then each successive one of the first parts is rotated to wind the successive associated lengths of wire thereon as the first parts are advanced to the next work station where a second part is assembled to the first part, and where, simultaneously, the insulation on successive other portions of the wire extending from the associated ones of the first parts is removed. Then the assembly of the first and second parts is advanced to another work station where the successive other portions of the wire are bonded to the successive ones of the second parts, after which the strength of the weld is tested.

BRIEF DESCRIPTION OF THE DRAWINGS

Other objects and features of the present invention will be more readily understood from the following detailed description of specific embodiments thereof when read in conjunction with the appended drawings, in which:

FIG. 10 is an enlarged sectional view of a pin and sleeve subassembly feed device of the apparatus of FIG. 2 taken along line 10—10 thereof with portions broken away for purposes of clarity;

FIG. 11 is an enlarged detailed view of the pin and sleeve subassembly feed device of FIG. 10 showing the movement of successive pin and sleeve subassemblies from a vibratory bowl feeder to a placement slide for pushing the pin and sleeve subassemblies over the workholder in registration with that station;

FIG. 12 is an enlarged sectional view of a conductor wire feeding station of the apparatus of FIG. 2 taken along line 12—12 thereof illustrating the conductor wire being payed out from a supply spool and advanced through a stripping device wherein predetermined portions of the conductor wire are bared of the insulation;

FIG. 13 is an enlarged sectional view of a welding device of the apparatus of FIG. 2 taken along line 13—13 thereof;

FIG. 13A is an enlarged perspective view of a portion of a welding electrode of the welding device of FIG. 13;

FIG. 14 is an enlarged sectional view of the welding station of FIG. 13 taken along line 14-14 thereof which illustrates a pinion orienter located on the underside of the turntable at the welding station for orienting the pinion attached to a shaft extending from below the workholder and which engages subsequently a rack for turning the workholder and the pin and sleeve subassembly held therein to facilitate winding the wire on the sleeve of the pin and sleeve subassembly;

FIG. 15 is an enlarged sectional view of a cutting station of the apparatus of FIG. 2 taken along line 15—15 thereof which illustrates a device for severing the wire extending from the weld thereof to the sleeve of the pin and sleeve subassembly in a leading workholder to the supply spool and with a new leading end of the conductor wire being welded to the sleeve of the succeeding one of the pin and sleeve subassemblies;

FIG. 16 is an enlarged sectional view of a swaging station of the apparatus of FIG. 2 taken along line 16—16 thereof which illustrates a device for swaging the upper peripheral rim of the sleeve of each of the pin and sleeve subassemblies to slope the rim inwardly;

FIG. 25 is an enlarged perspective view of the facilities provided at the welding and weld test station of FIG. 23 for testing the weld of the wire to the cap of the shell and cap subassembly in which a pawl is moved pivotally by the magnetic field which is established during the weld to engage the wire and impart a pulling force thereto to test the strength of the weld of the wire to the cap;

FIG. 26 is an enlarged sectional view of a testing and sorting device of the apparatus of FIG. 2 taken along line 26—26 thereof and illustrating a device for removing successive ones of the heat coils from the workholders and for testing and then sorting the successive ones of the heat coils; and FIG. 27 is a plan view of the turntable and the platform shown in FIG. 2 and illustrating various limit switches which are positioned on the turntable and the platform for controlling automatically the operation of the assembly apparatus.

DETAILED DESCRIPTION

Figure 3:
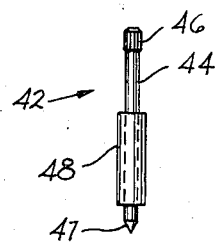
FIGS. 3 through 9 are a series of enlarged elevational views of the heat coil in various stages of assembly beginning with the pin and sleeve subassembly which is advanced through the work stations to have one end of a conductor wire welded thereto, then to have a shell and cap subassembly placed thereover and another end of the conductor wire welded to the cap of the shell and cap subassembly.
Figure 8:
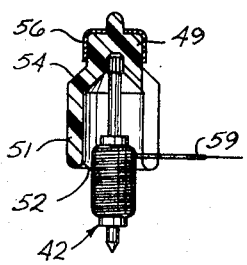
Figure 1:
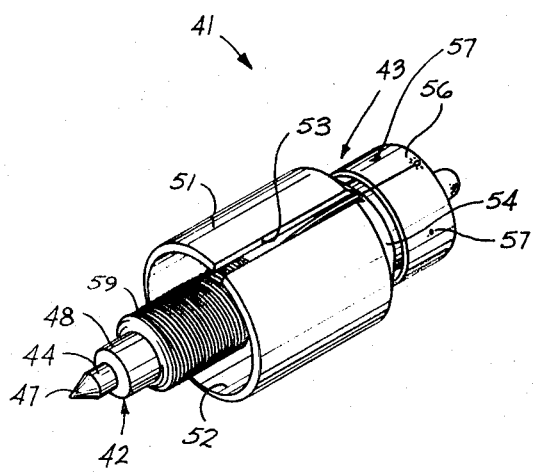
FIG. 1 is a perspective view of a heat coil showing a pin and sleeve subassembly which is assembled by the principles of the methods of this invention.

Referring now to FIG. 1, there is shown a heat coil assembly, designated generally by the numeral 41, which is to be assembled by the methods of this invention. The heat coil assembly 41 includes a pin and sleeve subassembly 42 and a shell and cap subassembly 43. As can be seen in FIG. 3, the pin and sleeve subassembly 42 includes a pin 44 having a knurled end 46 and a pointed end 47. The pin 44 is soldered with a low melting temperature alloy, such as a bismuth mixture, in a sleeve 48 with the pointed end 47 protruding slightly from one end of the sleeve. The knurled end 46 extends some distance from the other end of the sleeve 48. Each of a mass of the pin and sleeve subassemblies 42—42 is assembled with one of a mass of the shell and cap subassemblies 43-43 so that the knurled end 46 is received in a recess in a closed end 40 (see FIG. 8) of a housing or shell 51.

The shell 51 is cylindrically shaped, having an open end 52 at one end thereof, and may be constructed of any suitable material, such as a plastic. The shell 51 is also formed with a slot 53 parallel with the longitudinal axis of the shell. The other closed end 49 of the plastic housing 51 has a beveled portion 54 which connects the cylindrical portion of the housing with the closed end. Moreover, a solder-plated brass cap 56 is received over the closed end 49 and is attached to the plastic shell 51 by protrusions 57 in the cap being received in indentations in the shell 51 (see FIG. 1).

Figure 4:
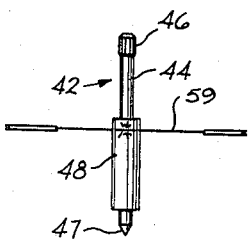
Figure 5:
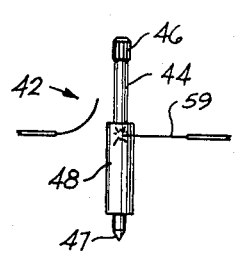
Figure 6:
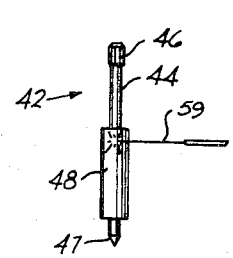
Figure 7:
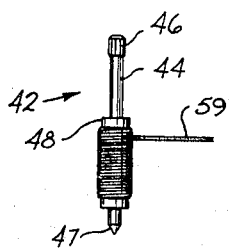

Prior to the assembly of the pin and sleeve subassembly 42 with the shell and cap subassembly 43, one end of an insulated conductor wire 59 extending from a supply has the insulation removed therefrom and is welded to the sleeve 48 of the pin and sleeve subassembly (see FIG. 4). Then a portion of the wire 59 extending to the pin and sleeve subassembly 42 is severed (see FIG. 5) from the supply and the new leading end of the wire is attached to the pin and sleeve subassembly in the next succeeding workholder while maintaining the trailing part of the wire taut, and an upper rim of the sleeve 48 is swaged (see FIG. 6). The pin and sleeve subassembly and the workholder are rotated and an insulated portion of the conductor wire 59 is wound around the sleeve 48 (see FIG. 7). Subsequently, the insulation is removed from another portion of the length of wire and one of the pin and sleeve subassemblies 42—42 is assembled with the shell and cap subassembly 43 with the knurled end 46 received in the closed end 49 and with the other unwound part of the conductor wire extending through the slot 53 in the shell 51 (see FIG. 7). Then, the portion of the conductor wire 59 is welded to the cap 56 (see FIG. 8), after which the strength of the weld of the wire to the cap is tested.

GENERAL OVER-ALL DESCRIPTION OF THE APPARATUS

Figure 9:
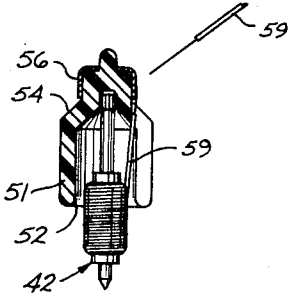
Figure 19:
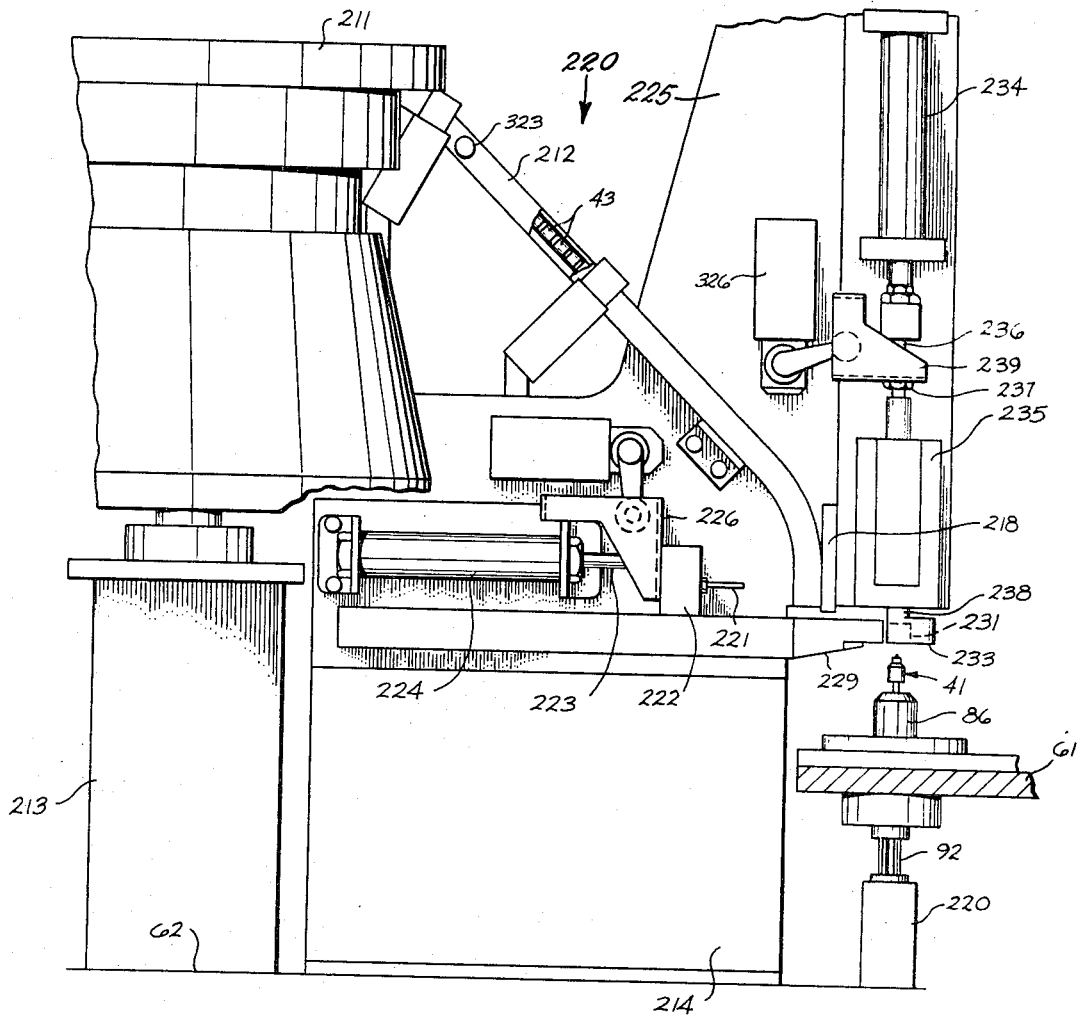
FIG. 19 is an enlarged sectional view of a shell subassembly feeding an assembly device at a combined shell assembly and stripping station of FIG. 2 taken along line 19—19 thereof which illustrates a device for feeding successive ones of a mass of shell and cap subassemblies into alignment with, and then assembling the shell and cap subassemblies to, successive ones of the pin and sleeve subassemblies.
Figure 20:
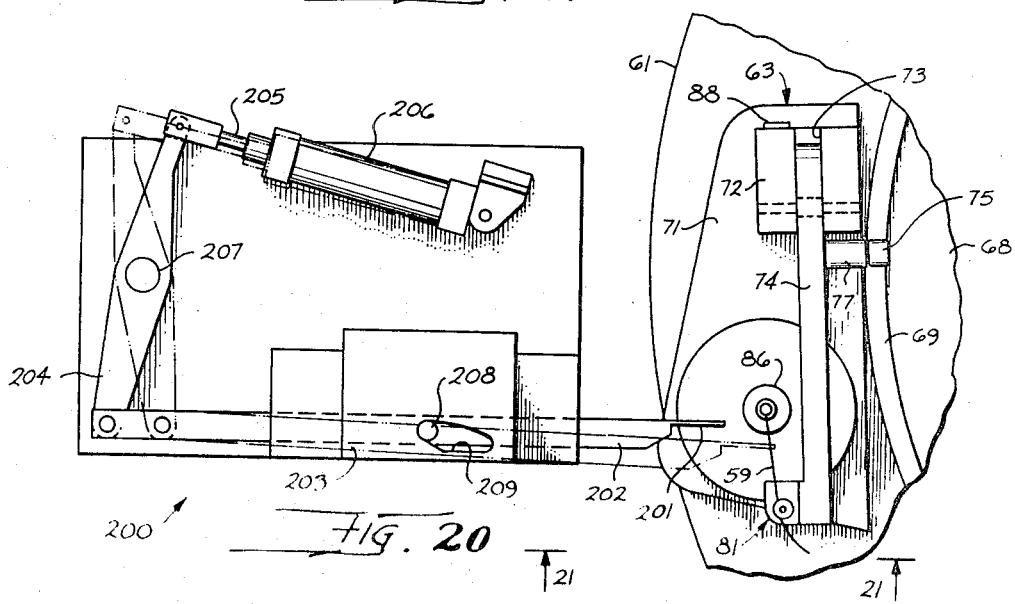
FIG. 20 is an enlarged plan view of a stripping device at the shell assembly and stripping station shown in FIG. 19 and the apparatus shown in FIG. 2 whereat the insulation is stripped from a portion of the conductor wire extending from each of the pin and sleeve subassemblies.

An apparatus, designated generally by the numeral 60 (see FIG. 2), for carrying out the principles of the methods of this invention includes a turntable 61 which is mounted rotatably on a base 62 (see FIG. 10) and which has a plurality of work stations arrayed about the periphery thereof. Moreover, the turntable 61 also has a plurality of workholders 63—63 attached to the turntable around the periphery thereof. At a first station (station No. 1, FIG. 2), a feeding device, designated generally by the numeral 100, (see FIG. 10), feeds successive ones of a mass of the pin and sleeve subassemblies 42—42 (see FIG. 3) into successive ones of the workholders 63—63. Then a leading one of the workholders 63—63 is moved with the turntable 61 to a second work station (station No. 2, FIG. 2) where a stripping blade 141 (see FIG. 12) strips a leading end of the insulated wire 59 and a welding device 150 (see FIG. 13) welds the bared leading end to the sleeve 48 (see FIG. 4) of the pin and sleeve subassembly 42. The conductor wire 59 may, for example, have a copper-nickel-zinc composition. As the turntable 61 is moved rotatably into a third work station (station No. 3, FIG. 2), the wire 59 extends from the pin and sleeve subassembly 42 to a supply 64 of the wire. At the third work station a cutting device, designated generally by the numeral 160, (see FIG. 15), severs a length of the wire 59 extending to the pin and sleeve subassembly 42 (see FIG. 5) in the workholder 63 from the supply 64 with the new leading end of the wire 59 attached to the sleeve 48 of the pin and sleeve subassembly 42 in the next succeeding workholder 63. The workholder 63 is advanced to a fourth work station (station No. 4, FIG. 2) where a swaging device, designated generally by the numeral 190 (see FIG. 16), turns an upper rim of the sleeve 48 inwardly (see FIG. 6). After the rim of the sleeve 48 has been swaged, the workholder is indexed through a fifth work station and the pin and sleeve subassembly 42 is rotated to wind the length of wire 59 on the sleeve 48 (see FIG. 7) while tensioning the length of wire extending from and secured to the pin and sleeve subassembly 42. As the wire 59 is wound on the sleeve 48, the workholder 63 is advanced with the turntable 61 to the sixth work station (station No. 6, FIG. 2) where a stripping device 200 (see FIG. 20) removes the insulation from a portion of the wire extending from the pin and sleeve subassembly 42, (see FIG. 7), and where a feeding device, designated generally by the numeral 210 (see FIG. 19), places a plastic shell 51 over the knurled end 46 of the pin and sleeve subassembly 42 (see FIG. 8). Then the heat coil assembly 41 is moved to a seventh work station (station No. 7, FIG. 2) whereat a welding device, designated generally by the numeral 240, (see FIG. 23), welds the portion of the wire 59 to the cap 56 (see FIG. 9) whereafter the strength of the weld to the cap is tested. Finally, the turntable 61 is indexed to position the heat coil assembly 41 at a final work station (station No. 8, FIG. 2) where a testing and sorting device, designated generally by the numeral 260, determines an electrical test characteristic of the heat coil assembly, after which the heat coil assembly is ejected therefrom and sorted in accordance with the test characteristic.

CONVEYOR

Figure 2:
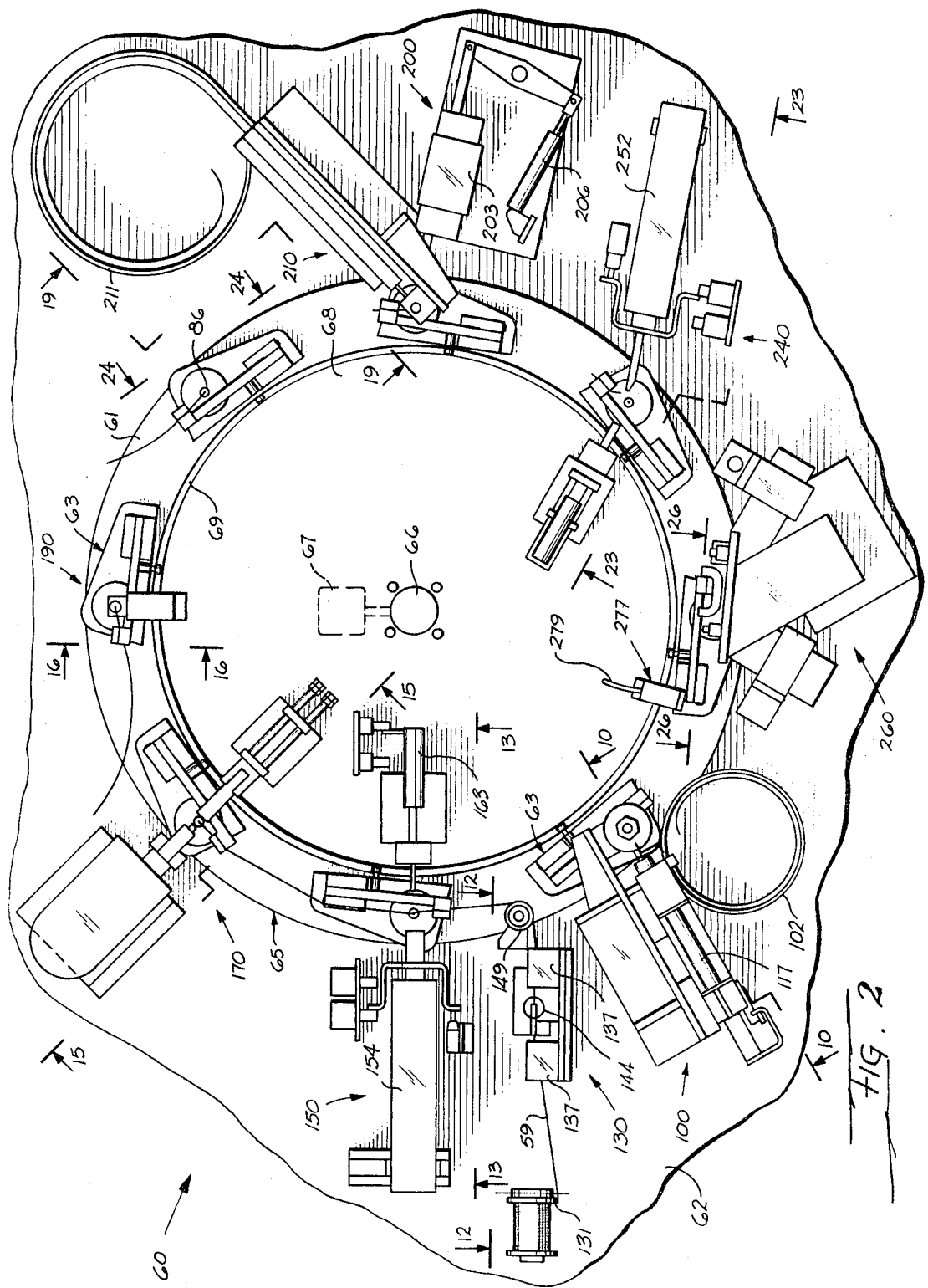
FIG. 2 is a plan view of an apparatus used for carrying out the principles of this invention which includes a rotatably mounted circular turntable having a plurality of workholders arrayed about the circumferential edge thereof for advancing each of the workholders successively through each of a plurality of work stations for assembling a pin and sleeve subassembly with a shell and cap subassembly to assemble a heat coil.

Referring now to FIG. 2, there is shown a conveyor, designated generally by the numeral 65, which includes the turntable 61. The turntable 61 is secured to a shaft 66 and is moved rotatably with the shaft intermittently and successively in a clockwise direction, as viewed in FIG. 2, to index the turntable through each of a plurality of work stations by a continuously operated drive motor 67 (see FIG. 2). The turntable 61 is mounted on the shaft 66 so that the turntable is spaced from the base 62 (see FIG. 10). Moreover, a stationary, circular top worktool platform 68 is mounted on the base 62 and is concentric with the turntable 61 (see also FIG. 13). However, the circular top platform 68 has a diameter somewhat smaller than the diameter of the turntable 61. In this way, a plurality of the workholders 63—63 may be mounted on and individually attached to the turntable 61 and arrayed about the periphery thereof. Then, at each of the plurality of work stations, a plurality of work devices which are used to assemble the heat coil assemblies 41—41 may be attached to the circular top platform 68 and to the base plate 62, and may cooperate to perform work functions on the workpieces in the workholders which are positioned on the turntable 61 in the space therebetween.

The top of the platform 68 has an annular cam surface 69 (see FIGS. 2 and 13) concentric with the platform and adjacent the peripheral edge of the platform. The annular cam surface 69 has a height ($h$) (see FIG. 13) which varies along the circumference thereof to present a contoured or cam surface which is used in the winding operation of the wire 59 to distribute the wire on the pin and sleeve subassembly 42 and which will be hereinafter described in detail.

Figure 17:
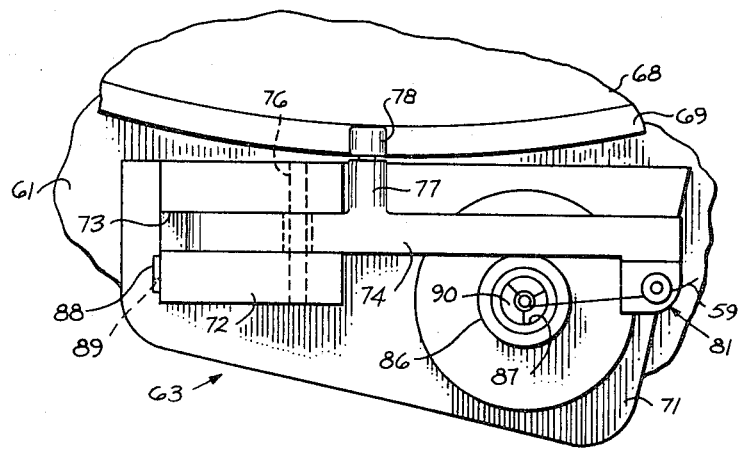
FIG. 17 is an enlarged plan view of one of the workholders which is arrayed about the circumferential peripheral edge of the turntable and having a pivotally mounted arm for distributing the wire around the sleeve of a pin and sleeve subassembly as the arm is moved pivotally by a cam follower which rides on a contoured cam surface on a platform.

Referring now to FIGS. 2 and 17, it can be seen that each of the workholders 63—63 includes a base plate 71 having a block 72 attached thereto at one end. The block 72 has a longitudinal channel 73 formed therethrough for receiving one end of a distributor arm 74. The distributor arm 74 is pivotally mounted at one end thereof to the block 72 by a pin 76 with the other end of the distributor arm extending from the channel 73 in a direction opposite to the clockwise rotary movement of the turntable 61.

The distribution arm 74 is assembled with a protruding portion 77 which extends radially inwardly from the distributor arm toward the top circular platform 68. A cam follower 78 is mounted rotatably on the protruding portion 77 and engages the annular cam surface 69 of the top circular platform 68. In this way, the cam follower 78 supports the unpinned other end of the distributor arm 74 and, as the turntable 61 is moved rotatably about the stationary platform 68, the cam follower rides on the cam surface 69 to move pivotally the distributor arm 74 in accordance with the configuration of the cam surface.

Moreover, the unpinned other end of the distributor arm 76 is equipped with a tensioning device 81 (see FIG. 24) for receiving and tensioning the wire 59. The tensioning device 81 includes a stud 82 having a threading groove in which the wire 59 is received with the stud 82 positioned between the distributor arm 74 and an overlying bracket 83. A spring mounted screw 84 extends through the bracket 83 and the stud 82 and into the distributor arm 74 in order to mount the stud and to adjust the compressive force between the stud 82 and a boss 85 of the distributor arm. The tightening of the screw 84 increases the clamping effect of the stud 82 on the wire 59 in the groove to tension the wire.

Each of the workholders 63—63 includes a guide 88 having a V-shaped opening 89 and mounted on a leading end of the block 72 (see FIG. 17). As can best be seen in FIG. 24, the stud 82, a chuck 86 and the guide 88 are arranged on the workholder 63 so that the length of the wire 59 strung between the V-shaped opening 89 and engaging the stud 82 is substantially linear and engages the top portion of the circumferential surface of the sleeve 48 of the pin and sleeve subassembly 42 held in the chuck 86 (see also FIG. 4).

In order to hold one of the pin and sleeve subassemblies 42—42, the chuck 86 having a housing 78 is positioned on the base plate 71 of the workholder 63 between the threading device 81 of the distributor arm 74 and the block 72. The chuck 86 has an opening formed between a plurality of jaws 90—90 (see FIG. 17) for receiving the pointed end 47 of the pin 44 and for holding the pin in an upright position with the knurled end 46 extending upwardly. The jaws 90—90 are attached to a shaft 91 which extends downwardly through an opening in the turntable 61 and which is spring biased in an upward direction. In this way, the jaws 90—90 are normally biased upwardly to cam against the wall of the opening in the housing 87 of the chuck 86 to maintain the jaws in a closed position. As the shaft 91 is moved downwardly, the jaws 90—90 are drawn downwardly and are cammed against the wall of the housing 87 to open the jaws to permit insertion of a pin and sleeve subassembly 42.

The chuck 86 of the workholder 63 is also secured to the shaft 91 (see FIGS. 10 and 24) which is mounted rotatably through the base plate 71 and the turntable 61 in order to move rotatably the pin and sleeve subassembly 42 held on the chuck to wind the wire 59 on the sleeve 48. The shaft 91 has a pinion 92 formed on the lower end thereof and has a collar 93 attached thereto just below the lower end of the pinion 92. The pinion 92 is designed to mesh with a rack 94 (see FIG. 18)

mounted to the base 62 of the apparatus 60. As the turntable 61 is indexed, the pinion 92 engages with the rack 94 to turn the shaft 91 and rotate the chuck 86 and the pin and sleeve subassembly 42 which is held between the jaws 90—90 of the chuck. In order to distribute the wire 59 vertically around the sleeve 48, the cam follower 78 of the distributor arm 74 rides on the contour of the annular cam surface 69 (see FIG. 17) to move pivotally the distributor arm about the pin 76 to distribute the wire on the pin and sleeve subassembly 42 which is rotated with the chuck 86 by the cooperation between the pinion 92 and the rack 94.

PIN AND SLEEVE SUBASSEMBLY FEEDING STATION

Referring now to FIGS. 2, 10 and 11, there is shown the pin and sleeve subassembly feeding device 100 for feeding successive ones of a mass of the pin and sleeve subassemblies 42—42 into successive ones of the chucks 86—86 of the workholders 63—63 which are spaced around the periphery of the turntable 61. The pin and sleeve subassembly feeding device 100 includes a frame 101 which is mounted on the base 62 of the apparatus 60 and also includes any commercially available vibratory bowl feeder 102 which may be adapted for use in the apparatus 60. The vibratory bowl feeder 102 is operated to move the pin and sleeve subassemblies 42—42 from within the bowl along a ledge 103 and to advance the pin and sleeve subassemblies to a feed opening 104 formed in the ledge. As can be seen in FIG. 11, the feed opening 104 is adapted to receive a plurality of the pin and sleeve subassemblies 42—42.

The opening 104 overlies a reciprocally movable slide 106 which is moved radially outward from the turntable 61 toward the bowl feeder 102 so that a receiving slot 107 in the slide receives the leading one of the pin and sleeve subassemblies 42—42 which has been advanced along the ledge 103 and into the opening by the vibratory forces imparted the bowl feeder. Then, the slide 106 is moved radially inward of the turntable 61 away from the bowl feeder 102 so that a solid portion 108 of the slide now underlies the opening 104 and supports the remaining pin and sleeve subassemblies 42—42 in the opening. Moreover, the slide 106 is separated physically from the bowl feeder 102 so that the vibrations of the bowl feeder are not imparted to the slide, which vibrations may unduly effect the operation of the slide in feeding the pin and sleeve subassemblies 42—42 to the workholder 63. After the slide 106 has received a leading one of the pin and sleeve subassemblies 42—42 in the receiving slot 107 and is moved away from the bowl feeder 102, the receiving slot is positioned over a pin 109 (see FIG. 11).

The pin 109 is used to orient the pin and sleeve subassemblies 42—42 for subsequent movement into one of the chucks 86—86 on one of the workholders 63—63 in registration with the feeding device 100. The pin 109 is mounted transversely of the receiving slot 107 so that as each of the pin and sleeve subassemblies 42—42 is advanced by the slide 106 away from the opening 104, the pin and sleeve subassemblies are moved individually over and spaced above the pin, whereupon the pin and sleeve subassemblies drop vertically by gravity and come to rest on the pin.

The pin 109 is positioned beneath the right hand location of the receiving slot 107, as viewed in FIG. 11, so that regardless of the longitudinal orientation of the pin and sleeve subassembly 42 within the receiving slot, the pin and sleeve subassembly pivots about the pin so that the pointed end 47 of the pin 44 is always oriented downwardly. Because of the construction of the pin and sleeve subassembly 42, the center of gravity is somewhere within the sleeve section 48. If the pin and sleeve subassembly 42 is fed with the pointed end 47 forward (as related to line of advancement along the ledge 103 of the bowl feeder 102), the pin and sleeve subassembly comes to rest on the pin 109 so that the heavier sleeve 48 drops vertically downward first through a passage 111 and then into and through a chute 112, into a funnel 113 and into a nest 114 formed in a second slide 116 (see FIGS. 10 and 11).

The second slide 116 is reciprocally movable by an air cylinder 117 (see FIG. 10) so that as each of the successive ones of the pin and sleeve subassemblies 42—42 is received in the nest 114 in the second slide, the slide is moved by the air cylinder radially inward toward the turntable 61 to position successively each of the pin and sleeve subassemblies over one of the chucks 86—86 of the workholders 63—63 currently in position under the feeding device 100. Moreover, the nest 114 in the slide 116 is formed between a pair of opposed resilient fingers 118—118 (see FIG. 11) which are biased inwardly toward each other by a pair of opposed adjustably settable lugs 119 to clamp one of the pin and sleeve subassemblies 42—42 therebetween.

As can best be seen in FIGS. 10 and 11, the slide 116 is formed with one end having tapered camming surfaces 115—115 which are used to control the escapement of the pin and sleeve subassemblies 42—42 from the slide 106 into the opening 111. Normally, the slide 106 is biased to the right, as viewed in FIG. 11, by a pivotally mounted rod 105 which has one end protruding into an opening in the slide and which has the other end urged in a clockwise direction, as viewed in FIG. 11, and into engagement with one of the camming surfaces 115—115 by a compression spring 110. When the slide 116 is moved to position the pin and sleeve subassembly 42 held in the nest 114 thereof over one of the chucks 86-86, one of the camming surfaces 115—115 is cammed against the lower follower end of the rod 105 to move pivotally the rod in a counterclockwise direction, as viewed in FIG. 11, to move the slide 106 to the left to align the receiving slot 107 with the opening 104. The alignment of the receiving slot 107 with the opening 104 permits the lowermost one of the pin and sleeve subassemblies 42—42 to drop into the receiving slot with the remaining pin and sleeve subassemblies supported on the pin and sleeve subassembly in the receiving slot. Then, when the slide 116 is moved retractably away from the chuck 86, the follower end of the rod 105 rides along one of the tapered camming surfaces 115—115 to permit the spring 110 to urge the rod in a clockwise direction. As the rod 105 is moved in a clockwise direction, the slide 106 is advanced to the right, as viewed in FIG. 11, to align the receiving slot 107 with the opening 111 and to allow the pin and sleeve subassembly to drop downwardly into engagement with the pin 109 and then into the chute 112.

As the slide 116 is moved over the chuck 86 of the workholder 71, currently positioned in registration with the feeding device 100, an air operated plunger 121 is moved downwardly by an air cylinder 122, acting through a rod 123 slidably secured in a sleeve 124. The plunger 121 imparts a pushing force to the pin and sleeve subassembly 42 and thereupon moves the fingers 118—118 away from one another as the plunger continues to move downwardly and push the pin and sleeve subassembly through the nest 114 in the slide 116 and into the chuck 86 with the knurled end 46 of the pin 44 oriented upwardly (see FIG. 3). Simultaneously therewith, an air cylinder 126 is actuated to move a piston rod 127 and a block 128 downwardly, as viewed in FIG. 10, to impart a pulling force through a plate 129 against the collar 93 to move the shaft 91 downwardly. As the shaft 91 is moved downwardly, the jaws 90—90 in the chuck 86 are opened to permit the pin and sleeve subassembly 42 to be received in the opening therebetween.

WIRE FEEDING AND WELDING STATION

The pin and sleeve subassembly 42 in a leading one of the workholders 63—63 is indexed into a second work station of the apparatus 60 whereat a wire feeding and a welding device, designated generally by the numerals 130 and 150, respectively, (see FIG. 2), removes the insulation from a leading end of an insulated wire 59 and then welds the leading bared end to a top circumferential portion of the sleeve 48 of the pin and sleeve subassembly.

Referring now to FIG. 12, there is shown the wire feeding and stripping device 130 at the second work station which includes a spool 131 of the fine gauge, e.g., 0.007 inch insulated wire 50. The spool 131 of wire 59 is mounted for rotation on a stanchion 132 and is payed out so that the convolutions of wire are moved over one of the flanges of the spool. The insulated wire 59 is advanced through a spring-loaded guide block 133 having a pair of plates 134—134, each of which has a groove 136 formed therebetween for receiving the wire. The wire 59 is then advanced under a pair of spaced hold-down bars 137—137. The hold-down bars 137—137 are attached to and extend from a vertical plate 138 which is mounted on the base plate 62 of the apparatus 60.

Figure 21:
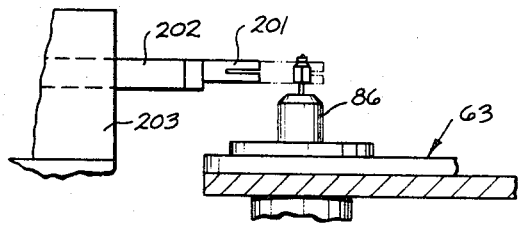
FIG. 21 is a detailed elevational view of the stripping device of FIG. 20 taken along line 21—21 thereof which illustrates in broken lines the actuated position of a stripping blade to engage with the insulation of a portion of the length of wire extending from the pin and sleeve subassembly in a chuck of the workholder.

In order to strip spaced portions of the continuous insulated wire 59 for subsequent welding of the wire to the sleeve 48 of each of the pin and sleeve subassemblies 42—42, a stripping blade 141 is provided. The stripping blade 141 has a tapered edge with a U-shaped groove 142 formed therein (see an identical blade 201, FIG. 21) to facilitate the reception of the wire 59. Moreover, the blade 141 is mounted on a rod 143 which extends from a cylinder 144. The rod 143 has a cam follower 145 extending externally therefrom for following a cam opening 146 in a plate 139 attached to the vertical plate 138. The cylinder 144 has one end thereof pivotally mounted on a pin 147 supported in a bearing 148. In this way, the stripping blade 141 is mounted for vertical movement as well as for horizontal movement.

As the wire 59 is advanced under the hold-down bars 137—137, the stripping blade 141 is actuated to move the blade upwardly and into engagement with the insulated wire in the groove 136. Then, the stripping blade 141 is moved in the direction of advancement of the wire 59 to strip a predetermined portion "L" (see FIGS. 4 and 12) from the wire. The wire 59 is then advanced continuously around a guide sheave 149 which is rotatably mounted on a mounting bracket 135 attached to the base 62 of the apparatus 60. The sheave 149 is positioned so that the wire 59 is pulled over the sheave and then through the groove between the stud 82 and the distributor arm 74 (see FIG. 2) and then through the guide 88.

The predetermined length of bared wire "L" is spaced along the continuous length of the wire 59 so that, as each of the chucks 86—86 on the workholders 63—63 is advanced into registration with the welding device 150, one of the predetermined lengths "L" of bared wire is in engagement with the top portion of the sleeve 48 of the pin and sleeve subassembly 42 held in the workholder 63 currently in registration with the welding device (see FIG. 4).

The welding device 150 is disposed in a clockwise direction from the guide sheave 149, as viewed in FIG. 1, and includes an anvil electrode 151 and a welding electrode 152 which are spaced apart and which are movable into engagement with the pin and sleeve subassembly 42 and with the bared exposed portion "L" of the wire 59. As the electrodes 151 and 152 engage the sleeve 48 and press the bared portion "L" of the wire 59 against the sleeve 48, the welding device is operated to secure the bared portion to the sleeve 48.

As can best be seen in FIGS. 2 and 13, the welding electrode 152 is mounted on a carriage 153 which is slidably mounted in a housing 154 on the base 62. The carriage 153 is moved slidably inward toward the turntable 61 by an air cylinder 155 to engage the welding electrode 152 with the bared length "L" of the wire 59. The carriage 153 also has a bracket 156 extending rearwardly therefrom along a radial line from the center of the turntable 61 for actuating a limit switch 322 and a limit switch 304 which are used in controlling the operation of the apparatus 60 (see FIG. 27).

The welding electrode 152 is formed to facilitate engaging the wire 59 between the welding electrode and the sleeve and to align vertically the wire on the sleeve 48. In order to accomplish these functions, the welding electrode 152 has a thickness, measured along a vertical axis, as viewed in FIG. 13, slightly less than twice the thickness of the wire 59. Moreover, the end of the welding electrode is formed with a concave surface 160 for receiving the sleeve 48 of the pin and sleeve subassembly 42. The concave surface 160 has a pair of aligned slots 165—165 extending transversely of the concave surface thereof. As the welding electrode 152 is moved radially inward of the turntable 61, the wire 59 is received in the spaced slots 165—165 and moved into engagement with the sleeve 48 and the concave surface 160.

Referring again to FIG. 13, it can be seen that the anvil electrode 151 is attached to a carriage 157 having a rod 158 which is mounted slidably in a pair of spaced bearings 159—159 that are supported on the platform 68. One end of the rod 158 has a vertically upstanding actuator plate 161 for actuating either of a pair of spaced limit switches 321 and 302 (see also FIG. 27) for controlling the operation of the apparatus 60. The limit switches 321 and 302 are attached to a mounting plate 162 which is secured to the platform 68. In order to move the anvil electrode 151 radially of the turntable 61 and slidably into engagement with the sleeve 48 of the pin and sleeve subassembly 42 in registration with the welding device 150, an air cylinder 163 has a piston rod 164 attached to the carriage 157.

Moreover, the second work station which includes the wire feeding and stripping device 130 and the welding device 150 also includes a pinion orienter 166, (see FIG. 14). The pinion orienter 166 is mounted on the base plate 62 of the apparatus 60 in alignment with the welding device 150. It has been noted hereinbefore that each of the chucks 86—86 has a shaft 91 depending downwardly therefrom with a pinion 92 and a collar 93 secured to a lower end thereof. In order for the gear teeth 96—96 of the pinion 92 to engage correctly with the rack 94 at a subsequent station in order to rotate the chuck 86 and the pin and sleeve subassembly 42 held therein, it is necessary that the shaft 91 be oriented so that a leading one 96 of the gear teeth 96—96 of the pinion will correctly engage the rack teeth of the rack 94. Should the pinion 92 be oriented incorrectly, the gear teeth 96—96 may jam against the rack 94 as the turntable 61 is indexed to engage the pinion with the rack.

As can best be seen in FIG. 14, the pinion orienter 166 includes a pivotally mounted lever arm 167 having a bossed end 168. Moreover, the lever arm 167 is normally biased in a clockwise direction, as viewed in FIG. 14, by a spring 168 into engagement with an adjustably settable stud bolt 169. As the turntable 61 is moved indexably to position one of the workholders 63—63 in registration with the welding device 150 then, should the pinion 92 associated with that particular workholder 63 be oriented properly, the gear teeth 96—96 on the pinion 92 are spaced and simply moved slidably along the surface of the bossed end 168 (see FIG. 14). However, should one of the teeth 96—96 of the pinion 92, which is farthest from the center of the turntable 61, be oriented in a direction along the radius of the turntable (see tooth 96a of the pinion 92 shown in broken lines, FIG. 14), then the tooth 96a engages the edge of the bossed end 168 to rotate slightly the pinion, the shaft 91 and the chuck 86 in a counterclockwise direction, as viewed in FIG. 14, until the next adjacent tooth (tooth 96b, FIG. 14) slides along the surface of the bossed end. The orientation of the pinion 92 is accomplished just prior to the welding of the wire 59 to the sleeve 48.

SEVERING STATION

With a bared portion of the wire 59 now welded to the sleeve 48 of the pin and sleeve subassembly 42 in the leading one of the workholders 63—63, the turntable 61 is indexed rotatably to position the chuck 86 of the leading one of the workholders in registration with a severing device, designated generally by the numeral 170, (see FIG. 15) at a third work station. At the third work station, the sleeve 48 of the pin and sleeve subassembly 42 is positioned between a pair of opposed, spaced cutting blades 171—171 of the severing device 170. One of the cutting blades 171—171 is supported from a frame 172 which is mounted on top of the circular top platform 68. The other one of the cutting blades 171—171 is mounted on a reciprocally movable carriage block 173 which is mounted on a stand 174 that is attached to the base 62. The carriage block 173 is rigidly attached to a rod 176 which is slidably mounted in bearing plates 177—177 which are attached to the top of the stand 174. An air cylinder 178 is mounted on the stand 174 between the bearing plates 177—177 and having a piston rod 179 extending therefrom and attached to the carriage 173.

Similarly, the one cutting blade 171 is mounted on a carriage block 181 that is attached to a forward end of a pair of spaced rods 182—182 which are slidably mounted in a pair of spaced plates 183—183 of the frame 172. Moreover, the block 181 is attached to one end of a pivotally mounted arm 184. The arm 184 is pivotally mounted at a center point thereof between a pair of spaced ears 186—186 which project from an upstanding portion of one of the spaced plates 174—174. The other end of the pivot arm 184 is pinned to an actuator rod 187. The actuator arm 187 extends over and above one of the workholders 63—63 positioned therebelow on the turntable 61 and has an end thereof pinned to an upstanding portion of the carriage block 173.

As the air cylinder 178 is actuated, the piston rod 179 is moved inwardly toward the turntable 61 to move the carriage block 173 and the cutting blade 171 attached thereto inwardly toward the chuck 86. As the block 173 is moved toward the turntable 61, the actuator rod 187 is moved toward the center of the turntable 61 to move pivotally the arm 184 in a clockwise direction, as viewed in FIG. 15, to move the lower end of the arm to the left and toward the chuck 86. As the lower end of the arm 184 is moved toward the workholder 63, the carriage block 181 and cutting blade 171 mounted thereon are moved inwardly toward the pin and sleeve subassembly 42 in the workholder 63 currently in position in the severing station. The cutting blades 171—171 cooperate to sever the bared end of the wire 59 on the leading (or clockwise) side of the pin and sleeve subassembly 42 currently in position in the severing station. After the wire 59 has been severed, the workholder 63 currently in the severing station has a pin and sleeve subassembly 42 held in the chuck 86 thereat with the bared end of the wire 59 welded to the sleeve 48 of the pin and sleeve subassembly and with the wire extending counterclockwise thereof past the pin and sleeve subassembly in the chuck currently in the wire feeding and welding station with the wire 59 continuing thereon to the supply spool 131.

As should be apparent, if the workholder 63, currently in the severing station, is the leading one of the workholders, then a leading bared end of the wire 59 is welded to the sleeve 48 of the pin and sleeve subassembly 42. In that case, it is not until the leading one of the workholders 63—63 is indexed to a fourth work station and a next successive one of the workholders is indexed into the severing station that severance of the wire 59 occurs. Then, when the wire 59 is severed, a length of the wire extends from the pin and sleeve subassembly 42 in the leading one of the workholders 63—63 with the trailing end thereof held taut between the stud 82 and the boss 85 of the distributor arm 74. A new leading end of the wire 59 is welded to the sleeve 48 of the next successive pin and sleeve subassembly 42 in the cutting station 170 and extends counterclockwise therefrom as viewed in FIG. 2 to the wire supply spool 131.

SWAGING STATION

After the wire 59 has been severed from the leading side of a pin and sleeve subassembly 42 which is held in the workholder 63 in the third work station, the workholder currently in the severing station is indexed with the turntable 61 in a clockwise direction, as viewed in FIG. 2, to move the pin and sleeve subassembly into a fourth work station and into registration with a swaging device, designated generally by the numeral 190 (see FIG. 16).

It will be recalled that the pin and sleeve subassembly 42 has been formed prior to the assembly thereof with the shell and cap subassembly 43 in the apparatus 60 and has a somewhat flared peripheral edge on the upper portion of a sleeve 48. The flared peripheral edge of the sleeve 48 curves outwardly and must be swaged inwardly to conform generally with the surface of the cylindrical sleeve.

The swaging device includes a swaging tool, designated generally by the numeral 191, which is mounted on a bracket 192 which is attached to the top surface of the top platform 68. The swaging tool 191 is moved downwardly by an air cylinder 193 attached to a top portion of the bracket to engage the swaging tool and the sleeve 48 of the pin and sleeve subassembly 42.

The swaging tool 191 has a die cavity 194 formed in the lower end thereof. The die cavity 194 is concentric with the outer circumference of the sleeve 48 of the pin and sleeve subassembly 42. Moreover, the innermost portion of the die cavity 194 is rounded so that as the swaging tool 191 is moved downwardly over the sleeve 48, the curved outer rim portion of the sleeve is swaged inwardly by the wall of the die cavity.

As the swaging tool 191 is moved over the sleeve 48, currently positioned in the fourth work station to swage the rim of the sleeve, the cutting blades 171—171 at the cutting station are moved to sever the wire 59 from the supply spool 131. Consequently, at this time, the pin and sleeve subassembly 42 currently in registration with the swaging device 190 has a leading bared end of a wire 59 welded to the top portion of the sleeve 48 and has a predetermined length of insulated wire 59 extending in a generally counterclockwise direction with a trailing portion thereof held tensioned between the stud 82 and the boss 85 of the distributor arm 74.

WIRE WINDING

The rack 94 is positioned on the base 62 so that the pinion 92 on the shaft 91 of each of the workholders 63-63 engages initially the teeth of the rack when the workholder is moved out of registration with the swaging device 190. After the rim of the sleeve 48 is swaged by the swaging tool 191, the turntable 61 is indexed whereupon the pinion 92 engages the rack 94 to rotate the shaft 91 and the chuck 86. (See FIG. 18.)

Figure 18:
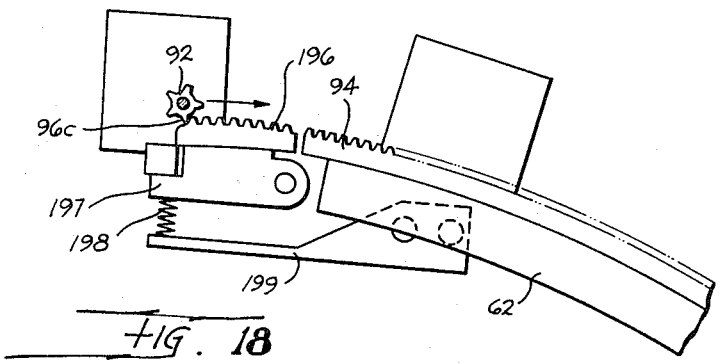
FIG. 18 is a detailed plan view showing the engagement of the pinion on the shaft extending from the chuck of each of the workholders with the rack on the underside of the turntable to rotate the chuck and the pin and sleeve subassembly held therewithin to wind the convolutions of wire on the sleeve as the distributor arm is moved pivotally.

As can be observed from FIG. 18, the rack 94 has a lead-in segment 196 which is attached to a pivotally mounted bar 197. The bar 197 is biased in a clockwise direction, as viewed in FIG. 18, by a spring 198 bearing on a lever 199 that is secured to the base plate 62. By this arrangement, the lead-in segment 196 yields and is moved pivotally in a counterclockwise direction should one of the teeth 96—96 (tooth 96c in FIG. 18) approach the rack segment so as to jam thereagainst. The yielding motion of the lead-in segment 196 facilitates the meshing of the pinion 92 with the rack 94.

The annular cam surface 69 varies from a height slightly above the level of the platform 68 from the first to the fourth work stations and then to a minimum winding height and back to a maximum winding height $h_1$ as the turntable is indexed from the fourth work station through a fifth work station and into a sixth work station at which ones of the mass of shell and cap subassemblies 43—43 are assembled to successive ones of the pin and sleeve subassemblies 42—42.

Moreover, the annular cam surface 69 is configured so that the height $h$ (see FIG. 13) of the cam surface is decreased gradually starting at a point on the cam surface directly above the point of engagement of the pinion 92 with the rack 94. Subsequently, the cam follower 78 riding on the cam surface 69 is urged upwardly to move pivotally the tension arm 74 and overcome the spring 79 to raise the trailing end thereof upwardly and distribute the convolutions of the wire 59 on the sleeve 48 of the pin and sleeve subassembly 42. In this way the distributor arm 74 is moved pivotally first in a clockwise and then in a counterclockwise direction, as viewed from outside the turntable 61, to array two layers of the wire 59 on the sleeve 48 on each of the pin and sleeve subassemblies 42-42.

Also, it will be recalled that a stud 82 in the workholder 63 cooperates with the boss 85 formed on the one end of the distributor arm 74 to hold the insulated wire 59 between the stud 82 and the top portion of the arm 74. Now, since the trailing end of the wire 59 has been severed, the winding of the wire 59 on the sleeve 48 of the pin and sleeve subassembly 42 pulls the wire between the stud 82 and the boss 85 of the tension arm 74. In this way, the tension device 81 serves to guide the wire 59 extending from the pin and sleeve assembly 42 as the distribution of the wire is made on the sleeve 48 of the pin and sleeve subassembly 42.

As the turntable 61 is indexed into the sixth work station, the pinion 92 is disengaged from the rack 94 and the cam follower 79 now resumes following a portion of the cam surface 69 which is generally planar with the top surface of the platform 68. Hence, the distributor arm 74 remains in a generally constant orientation with a portion of the wire 59 which has been wound on the sleeve 48 held taut by the stud 82 at the trailing end of the arm.

SHELL ASSEMBLY AND WIRE STRIPPING STATION

Following the winding operation, the pin and sleeve assembly 42 with the wire 59 around about the sleeve 48 thereof is advanced with the workholder 63 into the sixth work station which includes a stripping device, designated generally by the numeral 200, and a shell subassembly feeding and assembly device, designated generally by the numeral 210 (see FIG. 2). As can best be seen in FIGS. 20 and 21, the stripping device 200 includes a cutting blade 201 similar to the cutting blade 141 on the wire feeding and stripping device 130, and which is mounted on a reciprocally movable slide 202. The slide 202 has an end which is external to the turntable 61 and extends through a guide block 203 supported on the base plate 62 and has the other end thereof connected to one end of a rocker arm 204. The rocker arm 204 is connected at the other end thereof to a piston rod 205 extending from an air cylinder 206. Upon actuation of the air cylinder 206, the rocker arm 20 is turned in a clockwise direction, as viewed in FIG. 20, about a pin 207 to move slidably the stripping blade 201 inwardly to engage the insulated wire 59 and to then move the stripping blade a short distance laterally of the chuck 86 in a counterclockwise direction, as viewed in FIG. 20, to strip a predetermined length of insulation from the wire. The lateral motion of the stripping blade 201 is accomplished as a pin 208 which extends upwardly from the slide 202 rides in a cam slot 209 in the guide block 203.

The shell subassembly feeding and assembling device 210 feeds successive ones of a mass of the shell and cap subassemblies 43—43 from a vibratory bowl feeder 211 (see FIG. 19) into position over successive ones of the pin and sleeve subassemblies 42—42 currently in registration therewith. The bowl feeder 211 is mounted on a stand 213 which is supported on the base 62 and which is independent of a frame 214 which supports the elements for assembling the shell and cap subassemblies 43—43 with the pin and sleeve subassemblies 42—42.

The shell and cap subassemblies 43—43 are moved along a track (not shown) in the bowl to engage successive ones of the open ends 52—52 thereof with a fin (not shown). Air blasts are pulsed against the leading assembly 43 until the slot thereof is aligned with the fin (not shown). Then the assemblies 43—43 are moved from the vibratory bowl feeder 211 along an inclined feed track 212 so that the open end 52 of each of the shells 43—43 is oriented toward the turntable 61, and are maintained with the slots 53—53 thereof in the desired orientation by virtue of a fin 216 which is attached to the inclined track 212 and continues along the track from the bowl feeder 211 (see FIG. 19). At the lower end of the inclined feed track 212, the track curves downwardly so that the leading ones of the shell and cap subassemblies 43—43 are positioned with the longitudinal axes thereof being oriented vertically. The leading one of the shell and cap subassemblies 43—43 is engaged by a lip 217 (see FIGS. 19 and 22) extending from a pivotally mounted escapement member 218. The lip 217 of the escapement member 218 is biased inwardly toward the feed track 211 by a spring 219.

The pivotally mounted escapement member 218 cooperates with a reciprocally movable escapement pin 221 which has one end thereof secured to a block 222 that is attached to a piston rod 223 extending from an air cylinder 224. The air cylinder 224 is mounted on a vertical plate 225 which is supported on the frame 214. Moreover, the piston rod 223 also has a bracket 226 attached thereto for actuating limit switch 324 for controlling the operation of the apparatus 60. Upon actuation of the air cylinder 224, the other end of the escapement pin 221 is received in an opening 227 in the feed track 212.

Figure 22:
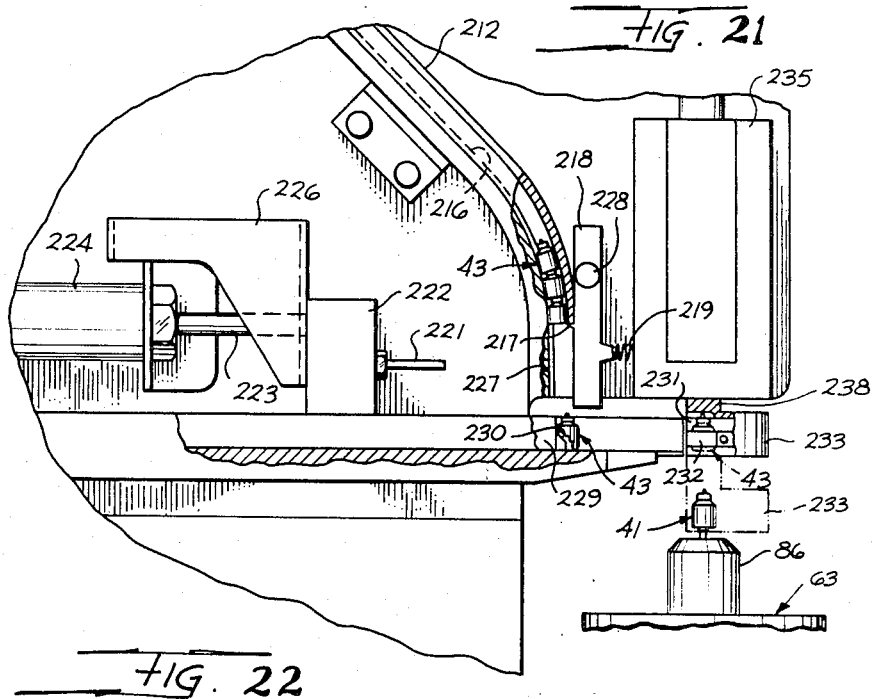
FIG. 22 is an enlarged elevational view of a portion of the shell subassembly feeding and assembly device of FIG. 19 for the escapement of the shells into a shell placement slide.

In operation, after the leading one of the shell and cap subassemblies 43—43 comes to rest on the lip 217, the reciprocally movable escapement pin 221 is moved through the opening 227 in the feed track 211 to span the feed track and engage a lower end of the pivotally mounted escapement member 218 to pivot the escapement member in a counterclockwise direction about a pin 228, as viewed in FIG. 22, against the spring 219. The leading one of the shell and cap subassemblies 43—43 is released from the lip 217 and comes to rest on the pin 221.

Then as the escapement pin 221 is withdrawn to the left, as viewed in FIG. 22, and back through the opening 227 in the feed track 212, the escapement member 218 is moved pivotally in a clockwise direction, as viewed in FIG. 22, about a pin 228 by the spring 219 and the next successive one of the shell and cap subassemblies 43—43 comes to rest against the lip 217 thereof. The leading one of the shell and cap subassemblies 43—43, resting on the escapement pin 221, drops vertically downward upon withdrawal of the pin and comes to rest in an opening in a slide 229. The slide 229 has a fin 230 (see FIG. 22) extending into the opening and which represents a continuation of the fin 216 in the feed track 212 for maintaining the shell and cap subassemblies 43—43 in the desired orientation.

The slide 229 is attached to the block 222 so that as the air cylinder 224 is actuated to move slidably the pin 221 to the right, as viewed in FIG. 22, and radially inward toward the turntable 61, the leading one of the shell and cap subassemblies 43—43 in the opening in the slide is positioned over the pin and sleeve subassembly 42 in the chuck 86 currently in registration with the sixth work station. The radially inward movement of the slide 229 moves the shell and cap subassembly 43 into a nest 231 formed between opposed inwardly biased spring fingers 232—232 in lower portion of a block 233 aligned vertically with the chuck 86. The spring fingers 232—232 hold the shell and cap subassembly 43 in alignment with the chuck 86 upon withdrawal of the slide 229.

When the one of the shell and cap subassemblies 43—43 is aligned with, and spaced above, the pin and sleeve subassembly 42 held in the workholder 63 currently in registration with the shell subassembly feeding and assembly device 210, an air cylinder 234 mounted on the vertical plate 225 is actuated to move a piston rod 236 and an upper portion of the block 233 downwardly and slidable through a guide 235. The block 233 is moved downwardly until the block engages a stop 237 which prevents further downward movement of the block. At that time the shell and cap subassembly 43 held within the nest 231 in the block 233 is positioned over, but not in engagement with, the pin and sleeve subassembly 42 in the chuck 86.

However, the stop 237 does not prevent further downward movement of an assembly ram 238 which is spring mounted on the block 233. The assembly ram 238 pushes the sheel and cap subassembly 43 through the nest 231 in the block 233 into engagement with the pin and sleeve subassembly 42, so that the ridges in the knurled end 46 of the pin 44 cut into the plastic material of the closed end 49 of the shell 51 to hold the pin 44 therewithin. A back-up plate (not shown) is mounted on the base 62 and aligned with the assembly ram 238 to support the shaft 91 of the workholder 63 to prevent vertical deflection of the pin and sleeve subassembly 42. As the piston rod 236 is moved downwardly, an actuator bracket 239 engages and operates a limit switch 326 for controlling the operation of the apparatus 60 (see FIG. 19).

The operation of the air cylinders 206 and 234 is accomplished simultaneously so that while the stripping device is removing the insulation from a portion of the wire 59 extending from the sleeve 48, the slide 229 is simultaneously moved radially inward over and spaced above the chuck 86 to position a shell and cap subassembly 43 in the nest 231. After the portion of the wire 59 has been stripped and after the slide 229 has been moved forwardly over the chuck 86, the air cylinders 206 and 234 are returned to an unoperated position to retract the stripping device 200 from the turntable 61 and the slide 229 from the position in registration with and spaced above the chuck 86. At this time, the length of wire 59 is wrapped about and extends from the sleeve 48 of the pin and sleeve subassembly 42 in the chuck 86 to the tensioning device 81 on the workholder 63 with a portion of the wire between the sleeve and the tensioning device having the insulation removed therefrom. The pin and sleeve subassembly 42 with the wire 59 wound thereon is then in condition to receive one of the shell and cap subassemblies 43—43 by operation of the ram described hereinbefore.

As the cycle of operation of the stripping device 200 and the shell subassembly feeding and assembly device 210 is completed at the sixth work station, the pin and sleeve subassembly 42 has a wire 59 wrapped around the sleeve 48 thereof with a bared portion thereof extending through the slot 53 in the cylindrical plastic shell 51 (see FIG. 8) which has been placed over the pin and sleeve subassembly now held within the chuck 86. The wire 59 extends in a counterclockwise direction from the sleeve 48 and held taut by the tensioning device 81. In order to complete the assembly of the heat coil assembly 41, it is then necessary to weld the bared portion of the wire 59 extending through the slot 53 to the metal cap 56 on the now upwardly oriented portion of the shell 51 (see FIG. 9). At this time also, it should be observed that the cam surface 69 on the platform 68 is substantially parallel with the platform and having a minimum thickness $h_1$ so that the distributor arm 74 is substantially horizontal.

WELDING AND WELD TEST STATION

After one of the shell and cap subassemblies 43—43 has been assembled to the pin and sleeve subassembly 42 in one of the workholders 63—63, the turntable 61 is indexed rotatably in a clockwise direction to move the workholder into a seventh work station and into registration thereat with a welding and weld test device, designated generally by the numeral 240 (see FIG. 2). The welding and weld test device 240 welds the bared portion of the extending part of the wire 59 to the metal cap 56 on the plastic shell 51 and then tests the strength of the weld to the cap.

Figure 23:
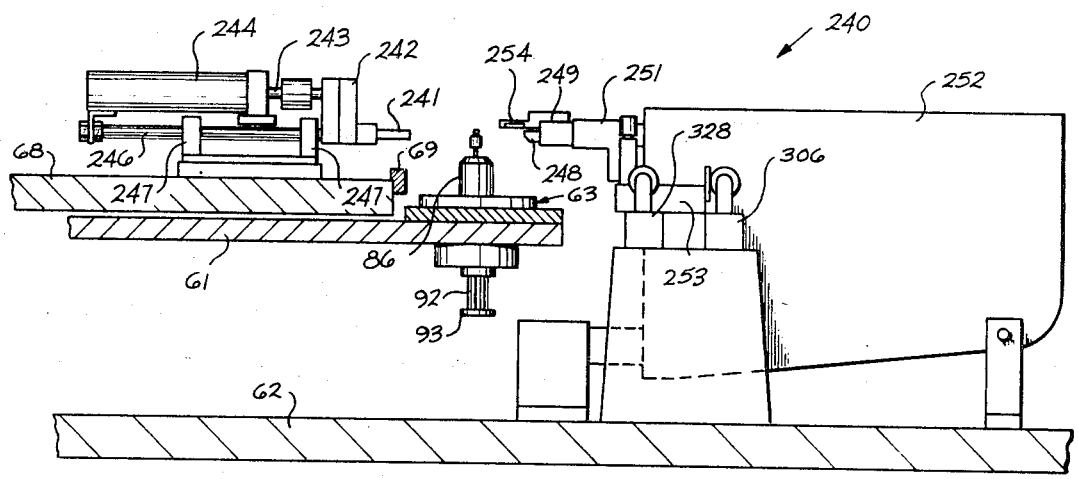
FIG. 23 shows an enlarged sectional view of a welding and weld test station of the apparatus of FIG. 2 taken along line 23—23 thereof and illustrating a welding device for welding a portion of the wire extending from the pin and sleeve subassembly to the cap of the shell and cap subassembly which is assembled to the pin and sleeve subassembly and being provided with facilities for testing the strength of the weld upon the return movement of the welding device to an unoperated position.
Figure 21:
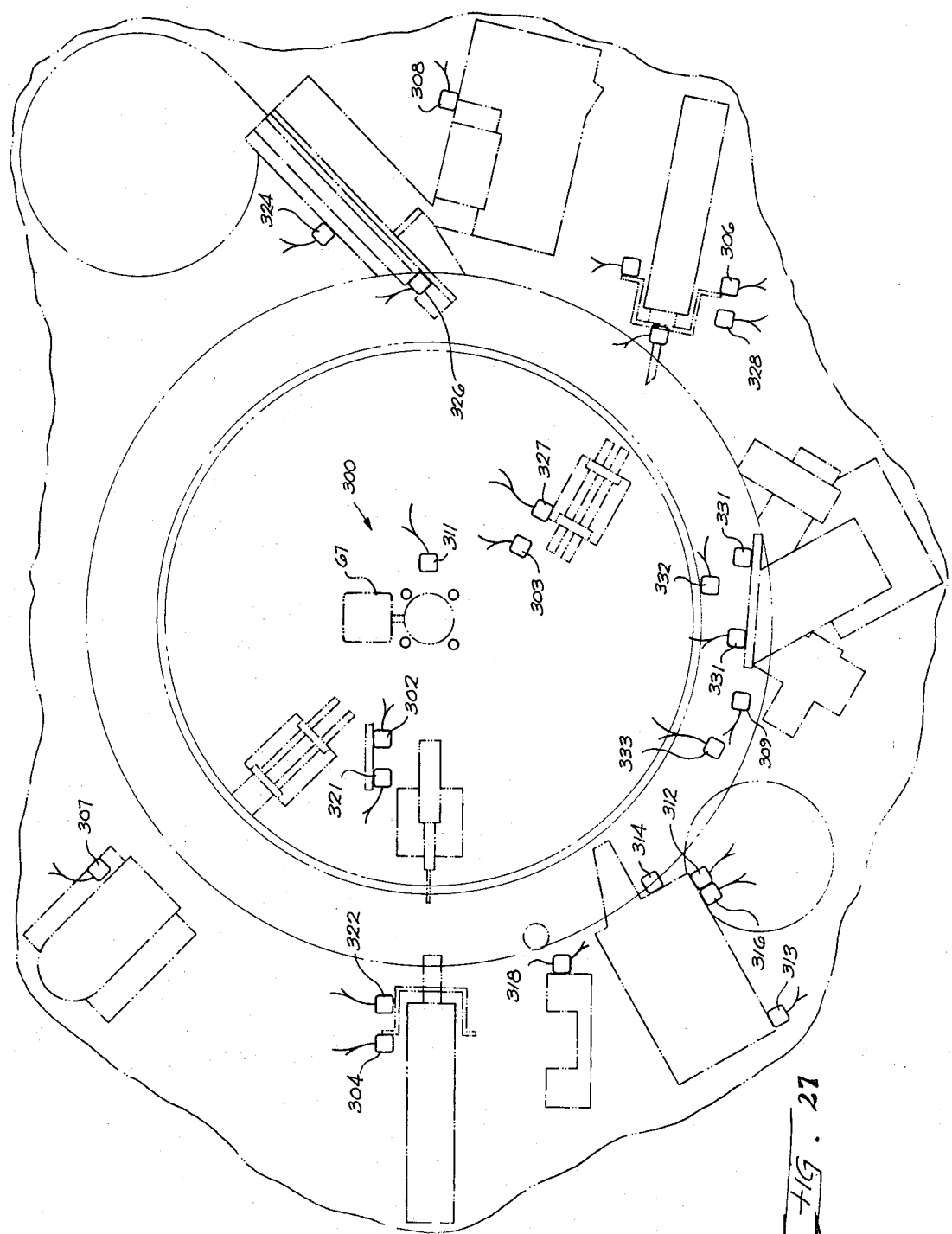

Referring now to FIG. 23, there is shown the welding and weld test device 240 which includes an anvil electrode 241 which is mounted on a slidably movable head 242 that is attached to an end of a piston rod 243 which is operated by an air cylinder 244. The air cylinder 244 is mounted on spaced carriage rods 246—246 supported in a pair of spaced bearing blocks 247—247 that are secured to the peripheral portion of the top platform 68.

The welding and weld test device 240 also includes a welding electrode 248 that is mounted on a head 249 of a reciprocally movable carriage 251. The reciprocally movable carriage 251 extends into a housing 252 that is attached to a top portion of the base plate 62. The spaced anvil and welding electrodes 241 and 248, respectively, are positioned so that the electrodes engage the metal cap 56 attached to the plastic shell 51 and the bared portion of the wire 59 to complete a circuit to weld the bared portion of the wire to the cap. Finally, the welding and weld test station includes an actuator bracket 253 which is attached to the reciprocally movable carriage 261 for actuating limit switches 306, 327 and 328 (see FIGS. 2 and 27) for controlling the operation of the apparatus 60.

Moreover, the carriage 251 also includes a cantilevered member 254 that extends above and over the welding electrode 248 (see FIGS. 23 and 25). The cantilevered member 254 has a slot 256 formed therein for receiving a pivotally mounted pawl 247. The pawl 257 normally extends outwardly (see broken line position of pawl in FIG. 25); however, the pivotal movement is limited to a stop (not shown) within the slot 256 so that an acute angle is formed between the pawl in the normal outward position and the cantilevered member 254. When the carriage 251 is moved longitudinally over the chuck 86 and transversely of the axis of the wire 59 to engage the welding electrode 248 with the wire, the pawl brushes past the length of the wire between the pin and sleeve subassembly 42 and the tensioning means 81 to move pivotally the pawl, in a counterclockwise direction, as viewed from a top plan view of FIG. 25, within the slot 256.

Figure 24:
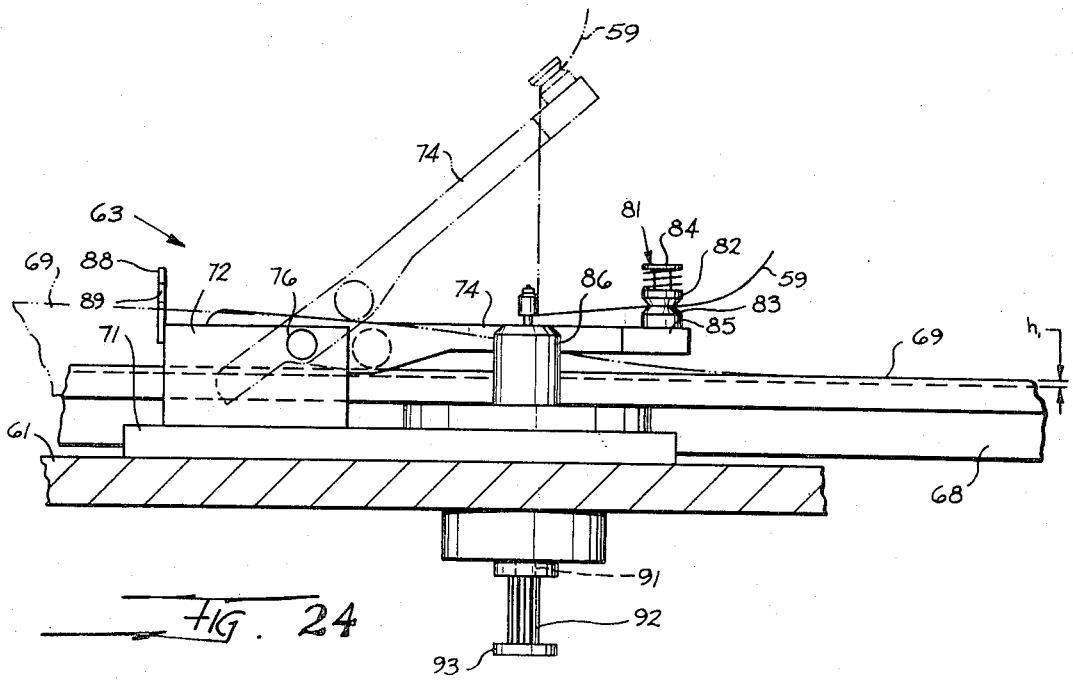
FIG. 24 is an enlarged elevational view of one of the workholders of the apparatus of FIG. 2 taken along line 24—24 thereof and illustrating the upward movement of the distributor arm on the workholder to push a portion of the wire extending from the pin and sleeve subassembly in approximate engagement with the cap of the shell and cap subassembly assembled to the pin and sleeve subassembly which is positioned in the workholder to facilitate welding of the wire to the cap.

It should be observed from FIGS. 24 and 25 that the pawl 257 is capable of being moved pivotally by the wire 59 since, at this portion of the circular top platform 68, the cam surface 69 is raised substantially in contour to a maximum height above the surface of the platform, and above that height, at the conclusion of the winding operation, so that the distributor arm 74 is moved in a clockwise direction (as viewed in FIG. 24) to position the tension device 81 above the electrodes 241 and 248.

With the distributor arm 74 in an upper inclined position, the wire 59, extending from the slot 53 to the tensioning device 81, is at an inclined position so that a portion of the bared wire is adjacent to the metal cap 56 (see FIG. 25). Then, when the electrodes 241 and 248 are brought into welding position over the chuck 86, the anvil electrode 251 engages the cap 56 and the welding electrode engages the bared portion of a wire 59 and moves the bared wire into engagement with the cap 56, whereupon the welding circuit is completed to weld the wire to the cap.

As the bared portion of the wire 59 is welded to the cap 56, a magnetic field is established in the vicinity of the weld and is utilized to test the strength of the weld. The establishment of the magnetic field attracts the pawl 257 to move pivotally the pawl out of the slot 256 to an outer normal position (see broken line position of pawl, FIG. 25). Then, after the weld has been completed and the anvil and welding electrodes 241 and 248, respectively, are withdrawn from the welding position, the carriage 251 is moved out from over the chuck 86. As the carriage 251 is withdrawn from the position over the chuck 86, the pawl 257, then in a normal outward position by virtue of the magnetic field, engages the wire 59 and exerts a pulling force on the wire. The force, imparted by the pawl 257 to the wire 59, is sufficient to break the wire at the point of weld (see FIG. 9). However, should the weld be defective, the wire 59 will not break at the weld, but rather the wire is pulled out of engagement with the cap 56. Hence, the welding and weld test device 240 performs a dual function in performing a test of the strength of the weld subsequent to the welding of the wire 59 to the cap 56 of the shell and cap subassembly 43.

After the remaining length of the bared portion of the wire 59 has been broken from the weld at the cap 56, there remains a short portion of the wire depending downwardly from the tension device 81 of the distributor arm 74 (see FIG. 25). It will be recalled that this portion of the wire is held confined between the stud 82 and the boss 85 on the distributor arm 74. This remaining portion of the wire 59 is removed at a subsequent work station following the ejecting of the heat coil assembly 41 from the apparatus 60.

TESTING AND SORTING STATION

After the bared portion of the wire 59 is welded to the cap 56, the turntable 61 is indexed rotatably in a clockwise direction to move the workholder 63 and chuck 86 to the final station and into registration with a testing and sorting device, designated generally by the numeral 260 (see FIGS. 2 and 26).

CONTROL SYSTEM AND OPERATION

In describing the operation of the apparatus 60 for assembling the heat coil assemblies 41—41, reference is made to FIG. 27 which shows various limit switches of an electrical control circuit, designated generally by the numeral 300, for controlling the operation of the apparatus. Initially, an operator depresses a push-button switch (not shown) to initiate the cycle of operation to position one of the pin and sleeve subassemblies 42—42 over one of the chucks 86—86 and for opening the chuck.

The operator depresses a cycle start push button switch (not shown) to complete a circuit to operate a clutch (not shown) to index the apparatus 60.

A photoelectric unit 301 (see also FIG. 19) is connected into the electrical control circuit 300. Normally, when one of the shell and cap subassemblies 43—43 appear in the lower portion of the inclined track 212, the light beam associated with the photoelectric unit 301 is broken. Should a jam-up occur and there is no shell and cap subassembly 43 in the lower portion of the track 212, the light beam is unbroken.

Then the operator throws a switch (not shown) to complete a circuit through the index motor 67 which is continuously running.

The return of all of the stations to an unoperated position at the beginning of the cycle actuates a plurality of limit switches. The return of the anvil electrodes 151 and 241 actuate the limit switch 302 and a limit switch 303, respectively, while the return of the welding electrode 152 and 248 operates limit switch 304 and limit switch 306, respectively. The return of the cutting blades 171—171 operates a limit switch 307, while the return of the stripping blade 201 operates a limit switch 308 to close the contact thereof. Moreover, the return of the collet chuck 261 operates the limit switch 309 to close the contact thereof.

When the pin and sleeve subassembly feeding device 100 is returned to an unoperated position, the collet chuck 86 is closed, which completes a circuit (not shown) for the return of the pin and sleeve subassembly placement slide 116. Also, the return of the testing and sorting device 260 to an unoperated position completes a circuit (not shown) to return the collet chuck 261 of the testing and sorting device. Subsequently, the turntable 61 is indexed.

After the turntable 61 has been indexed and the index clutch (not shown) disengaged, and if the turntable has been indexed through a predetermined angle of rotation, the workholders 63—63 are precisely aligned with the work stations and a limit switch 311 is actuated by a spring biased indexing pin (not shown) on the base 62 which is urged into one of the plurality of holes (not shown) in the turntable that are aligned with the workholders. Should the turntable 61 not be indexed fully, the pin (not shown) will not engage one of the index holes (not shown) and the limit switch 311 is not actuated.

Provided the turntable 61 has been indexed fully, the limit switch 311 is actuated and a circuit is conditioned for the return stroke of the shell and cap subassembly placement slide 229.

Also, provided there is a supply of the shell and cap subassemblies 43—43 in the inclined track 212, the contact of the photoelectric unit 301 is closed. The depression of the cycle start push-button switch (not shown) is interlocked to complete a circuit (not shown) to maintain the circuit through the bowl feeder 102.

The air cylinder 126 is actuated to move downwardly the block 128 and open the collet chuck 86 of the workholder 63 in registration with the feeding device 100. Finally, a circuit (not shown) is completed to operate the air cylinder 117 to advance the slide 116 to position one of the pin and sleeve subassemblies 42—42 over the workholder 63 in registration with the feeding device 100.

As the collet chuck 86 is opened, and the slide 116 is moved outwardly over the pin and sleeve subassembly 42 in the leading one of the workholders 63—63, the arm 120 actuates a limit switch 312 and a limit switch 313 (see FIGS. 10 and 27) to complete a circuit (not shown) to operate the air cylinder 122. The operation of the air cylinder 122 moves downwardly the insert ram 121 to move the pin and sleeve subassembly 42 through the nest 114 and into the chuck 86 of the leading one of the workholders 63—63.

As the insert ram 121 is moved downwardly, the insert ram actuates a limit switch 314. The actuation of the limit switch 314 completes a circuit.

The jaws of the collet chuck 86 are spring returned to a normal closed position with the pin and sleeve subassembly 42 held therebetween. As the collet chuck 86 is closed, the limit switch 316 is actuated to close the contact thereof and complete a circuit to actuate the air cylinder 117 and return the pin and sleeve placement slide 116. As the slide 116 is withdrawn to the left, as viewed in FIG. 10, the limit switch 317 is actuated to move retractably the insert ram 121.

As the insert ram 121 is returned upwardly, the limit switch 314 is actuated to complete a circuit to condition partially the all stations return circuit (not shown).

It should be observed that after each indexing movement and the operation of the work tools at the work stations, that the index clutch (not shown) will be engaged to render effective the continuously running motor 67 to index the turntable 61.

Simultaneously, with the operation of the pin and sleeve subassembly feeding device 100 at the first work station, the air cylinders 135—135 are moved downwardly, as viewed in FIG. 12 with the upper hold-down bars 137—137 clamping the wire 59 therebetween.

The cylinder 144 is actuated to advance the wire stripping blade 141 to strip a predetermined length "L" of the wire 59 which is subsequently welded to the sleeve 48 of the pin and sleeve subassembly 42. As the blade 141 is moved upwardly and to the left, as viewed in FIG. 12, by the rod 143, the cam follower 145 traces the cam opening 146.

An air blast device (not shown) is operated to direct a stream of air against the insulation being removed from the wire 59. Should the wire 59 be broken during the stripping operation, the tension on the wire 59 is released to permit a feeler to actuate a limit switch 318 to complete a circuit to illuminate a lamp 357 to indicate a broken wire (see FIG. 12).

Moreover, the air cylinder 163 (see FIG. 13) is actuated to advance the anvil electrode 151 into engagement with the sleeve 48 of the pin and sleeve subassembly 42 which is positioned in the workholder 63 currently in registration with the welding device 150. The movement of the anvil electrode 151 into engagement with the sleeve 48 actuates limit switch 321 to close the contact thereof and complete a circuit through a counter (not shown) to cycle the welding electrode 152 into engagement with the stripped portion of the wire 59 and the sleeve 48 to weld the wire to the sleeve of the pin and sleeve subassembly 42.

As the welding electrode 152 is advanced into engagement with the wire 59, the welding electrode actuates limit switch 322 to close a contact thereof and complete a circuit for advancing the anvil electrode 151.

To complete the cycle of the welding electrode 152, the welding electrode is returned to a normal retracted position. As the welding electrode 152 is moved to the left, as viewed in FIG. 13, the welding electrode actuates the limit switch 304. The actuation of the limit switch 304 conditions partially the all stations return circuit (not shown). Then the anvil electrode 151 is returned radially inward and to the right, as viewed in FIG. 13, and actuates the limit switch 302 to close the contact thereof to further condition partially the all stations return circuit (not shown).

Simultaneously, with the feeding of a pin and sleeve subassembly 42 in the first work station and the feeding of the wire 59 and the welding of a stripped portion thereof to the sleeve 48 of another pin and sleeve subassembly 42 in registration with the welding device 150, the cutting device 170 is operated to sever the wire 59 at the third work station. Then a length of the wire 59 has a leading end welded to the pin and sleeve subassembly 42 in the fourth work station and the trailing end thereof held taut in the tensioning device 81 of the workholder in the fourth work station with a new leading end of the wire which continues to the supply spool 131 welded to the pin and sleeve subassembly in the third work station.

The air cylinder 178 is operated to move the cutting blades 171—171 to sever the wire between the trailing end of one of the workholders 63—63 and the pin and sleeve subassembly 42 in the next successive one of the workholders.

As the cutting blades 171—171 are advanced toward each other to sever the wire 59, the cutting blade actuates the limit switch 307. Subsequently, the air cylinder 178 is actuated to return the cutting blades 171—171 to an unoperated condition. As the cutting blades 171—171 are returned to an unoperated condition, the limit switch 307 is actuated to condition partially the circuit for the return of all stations for the next cycle of operation. After all stations have been returned to an unoperated position, the index clutch (not shown) is engaged and the turntable is indexed through an increment of rotation to advance each of the workholders 63—63 to the next successive work station.

Then a leading one of the workholders 63—63 is moved with the turntable 61 in a clockwise direction, as viewed in FIG. 2, to position the pin and sleeve subassembly 42 in registration with the swaging device 190. As the air cylinder 178 of the cutting device 170 is actuated to sever the wire 59 at the third work station, the air cylinder 193 of the swaging device 190 is actuated to move the die 194 (see FIG. 16) downwardly and into engagement with the sleeve 48 of the pin and sleeve subassembly 42 in registration therewith. The die 194 swages the rim of the sleeve 48 to turn the peripheral edge thereof inwardly. Then, as the cylinder 178 is actuated to return the cutting blades 171—171 at the third work station, the air cylinder 193 is actuated to move the die 194 out of engagement with the pin and sleeve subassembly 42 so that the turntable 61 may be indexed.

Then as the turntable 61 is indexed in a clockwise direction, as viewed in FIG. 2, to move the leading one of the workholders 63—63 into the fifth work station, the cam follower 78 on the distributor arm 74 follows the lowered contoured configuration of the annular cam surface 69 to permit the spring 79 to move pivotally the distributor arm in a downward direction. Simultaneously therewith, the pinion on the lower portion of the shaft 91 engages the entrance teeth on the rack 94 (see FIG. 18) beneath the turntable 61. As the turntable 61 is indexed, the pinion 92 cooperates with the rack 94 to turn the shaft 91 and hence the chuck 86 with the pin and sleeve subassembly 42 held therein. Then, as the height of the cam surface 69 increases and as the turntable 61 is indexed to advance the leading one of the workholders into the sixth work station, the trailing end of the distributor arm 74 is move upwardly to distribute a second layer of convolutions of the wire 59 on the sleeve 48 as the pin and sleeve subassembly 42 is rotated with the chuck 86.

It should be observed that while the distribution of the wire 59 is made on the sleeve 48, the wire extending from the sleeve 48 is tensioned by the tensioning device 81 at the trailing end of the workholder 63. As the pinion 92 disengages from the rack 94 beneath the turntable 61, the chuck 86 and the pin and sleeve subassembly 42 are no longer rotated within the workholder 63 and, simultaneously therewith, the annular cam surface 69 assumes a level configuration so that the distributor arm 74 is no longer moved pivotally but is maintained by the spring 79 in a position generally somewhat above with the platform 68. At the close of the wire distribution cycle, the turntable 61 has been indexed to advance the pin and sleeve subassembly 42 with the wire 59 distributed on the sleeve 48 thereof into the sixth work station where one of a mass of the shell and cap subassemblies 43—43 is assembled to the pin and sleeve subassembly.

At the sixth work station, if successive ones of the shell and cap subassemblies 43—43 are fed from the bowl feeder 211 and backed up on the inclined track, the light beam from a photoelectric unit 323 is broken. Then, as the shell and cap subassemblies 43—43 are assembled to the pin and sleeve subassemblies 42—42, the shell and cap subassemblies move downwardly along the track 212 and the light beam is no longer interrupted. The photoelectric unit 323 is actuated to complete a circuit (not shown) to operate the bowl feeder 211 to feed additional ones of the mass of the shell and cap subassemblies 43—43 down the track 212.

Then, the air cylinder 224 is operated to move the slide 229 with one of the shell and cap subassemblies held therein radially inward. As the slide 229 is moved radially inward to insert a shell and cap subassembly 43 in the nest 231 aligned beneath the assembly ram 238, the bracket 226 on the slide trips limit switch 324 to complete a circuit (not shown) to operate the air cylinder 224 to return the shell placement slide 229 radially outward leaving the shell and cap subassembly held beneath the assembly ram 238 in the nest 231.

The return movement of the shell placement slide 229 causes the bracket 226 to operate the limit switch 324. Moreover, as the slide 229 is moved to the left, as viewed in FIGS. 19 and 22, the pin 221 is withdrawn from the opening 237 in the feed track 212 so that the next successive shell and cap subassembly 43 is no longer supported by the pin and drops into the slide 229. The escapement member 218 is urged in a clockwise direction by the spring 219 to move the lip 217 under the next successive one of the pin and sleeve subassemblies 43—43 in the track 212.

The air cylinder 234 is operated to drive the block 233 downwardly and then to move the assembly ram 238 further downwardly to drive the shell and cap subassembly 43 held in the nest 231 into engagement with the pin and sleeve subassembly 42. The stripping device 200 is advanced to strip a portion of the wire 59 near the trailing end thereof. As the stripping device 200 completes a path of motion of, first, into engagement with the wire 59, and then along the length thereof, the stripping device actuates the limit switch 308 to return the stripping device to an unoperated position.

Also, a bypass circuit is completed to direct a blast of air against the wire to force the stripped insulation material away from the wire 59.

As the assembly ram 238 is moved downwardly, the assembly ram operates a limit switch 326 to disable a circuit for advancing the assembly ram. Subsequently, the air cylinder 234 is actuated to return the assembly ram 238 upwardly, as viewed in FIG. 19, to an unoperated position. As the assembly ram 238 is moved upwardly, the assembly ram actuates the limit switch 326 to condition the all stations return circuit.

At the seventh station, the bared portion of the trailing end of the wire 59 is welded to the cap 59 of the shell and cap subassembly 43 in the workholder 63. The air cylinder 254 is operated to move the anvil electrode 251 into engagement with the cap 56. As the anvil electrode 251 is moved radially outward to engage the cap 56, the anvil electrode actuates the limit switch 327. The actuation of the limit switch 327 causes the welding electrode 248 to be cycled into engagement with the wire 59 to engage the wire with the cap 56 of the shell and cap subassembly 43 which is in registration with the welding and weld test device 240. As the welding electrode 248 is advanced into engagement with the wire 59, the welding electrode actuates a limit switch 328 to complete a circuit (not shown).

As the welding electrode 248 is cycled and returned to an unoperated position, the actuator bracket 253 actuates the limit switch 306 to condition the circuit (not shown) for all stations return. The anvil electrode 241 is returned to an unoperated position and actuates the limit switch to forther condition the all stations return circuit.

As the welding electrode 248 is returned toward the unoperated position, the pawl 257, which has been moved pivotally out of the slit 256 by the magnetic field established by the welding of the wire 59 to the cap 56, engages the wire (see FIG. 25). Then, as the welding electrode 241 is moved further toward the unoperated position, the pawl 257 imparts a pulling force to the wire. If the strength of the weld of the wire 59 to the cap 56 is acceptable, the wire is broken at the weld; if it is unacceptable, the wire is pulled out of engagement with the cap 56.

After the trailing end of the wire 59 has been welded to the cap 56, the pin and sleeve subassembly is indexed to an eighth and final work station where an electrical characteristic of the heat coil assembly 41 is determined and where the heat coil assembly is sorted in accordance with the electrical characteristic.

Then, as the chuck 86 is closed after the heat coil assembly 10 is released therefrom, the limit switch 309 is actuated to complete the all stations return circuit whereupon the index clutch (not shown) permits the turntable 61 to be rotated indexably for another cycle of automatic operation.

As the turntable 61 is indexed to move the work-holder 63 currently positioned in registration with the testing and sorting station 260 toward the pin and sleeve subassembly feed device 100, the chuck 86 is moved adjacent to, but spaced below a limit switch 333 (see FIGS. 1 and 27). Should the heat oil assembly 41 not be removed from the workholder 63 at the testing and sorting device 260, the heat coil assembly engages and actuates the limit switch 333 to complete circuit paths in the electrical circuit 300 to discontinue operation of the welding device 240.

And, finally, as the turntable 61 is indexed to move the workholder 63 from the testing and sorting device 260 to the feeding device 100, a scrap wire discarding device 277 engages the tensioning device 81 to force open the groove therein to permit an air blast from a tube 279 to direct the scrap wire away from the workholder.

It is to be understood that the above-described arrangements are simply illustrative of the principles of the invention. Other arrangements may be devised by those skilled in the art which will embody the principles of the invention and fall within the spirit and scope thereof.

What is claimed is:

1. A method of forming a weld and testing the strength of a welded joint between a portion of a length of wire and a part by engaging the wire with a test pawl, which includes the steps of:

holding the part with a length of the wire having a portion substantially adjacent to the part;

mounting the test pawl on a welding electrode so that the test pawl is movable longitudinally and transversely of the length of wire between the joint and the end of the wire;

advancing a welding electrode in a path of travel transversely of the length of wire to engage the welding electrode with the portion of the wire and to pivot the test pawl into a retracted position away from the axis of the wire;

welding the portion of the wire to the part to form a joint between the length of wire and the part and to establish a magnetic field about the vicinity of the weld to attract magnetically the pawl into an extended position which projects transversely of the length of the wire, and retracting the welding electrode to withdraw the pawl from beyond the wire and along a path which intersects the wire to impart a pulling force to the wire so that the wire is broken at the weld to indicate an acceptable joint of the wire to the part.

* * * * *